United States Patent
Prahlad et al.

(10) Patent No.: US 8,725,698 B2
(45) Date of Patent: May 13, 2014

(54) STUB FILE PRIORITIZATION IN A DATA REPLICATION SYSTEM

(75) Inventors: Anand Prahlad, Bangalore (IN); Vijay H. Agrawal, Jalgaon (IN)

(73) Assignee: CommVault Systems, Inc., Oceanport, NJ (US)

( * ) Notice: Subject to any disclaimer, the term of this patent is extended or adjusted under 35 U.S.C. 154(b) by 302 days.

(21) Appl. No.: 12/749,949

(22) Filed: Mar. 30, 2010

(65) Prior Publication Data

US 2011/0246429 A1    Oct. 6, 2011

(51) Int. Cl.
*G06F 17/30* (2006.01)

(52) U.S. Cl.
CPC .............................. *G06F 17/30212* (2013.01)
USPC ........................................................ 707/679

(58) Field of Classification Search
CPC .................................................. G06F 17/30212
USPC ............................................................ 707/679
See application file for complete search history.

(56) References Cited

U.S. PATENT DOCUMENTS

| | | | |
|---|---|---|---|
| 4,296,465 A | 10/1981 | Lemak | |
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,231,668 A | 7/1993 | Kravitz | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,263,154 A | 11/1993 | Eastridge et al. | |
| 5,265,159 A | 11/1993 | Kung | |
| 5,276,860 A | 1/1994 | Fortier et al. | |

(Continued)

FOREIGN PATENT DOCUMENTS

| AU | 2006331932 | 12/2006 |
|---|---|---|
| CA | 2632935 | 12/2006 |

(Continued)

OTHER PUBLICATIONS

U.S. Appl. No. 12/433,238, filed Apr. 30, 2009, Prahlad et al.

(Continued)

*Primary Examiner* — Huawen Peng
(74) *Attorney, Agent, or Firm* — Knobbe, Martens, Olson & Bear, LLP

(57) ABSTRACT

Stubbing systems and methods are provided for intelligent data management in a replication environment, such as by reducing the space occupied by replication data on a destination system. In certain examples, stub files or like objects replace migrated, de-duplicated or otherwise copied data that has been moved from the destination system to secondary storage. Access is further provided to the replication data in a manner that is transparent to the user and/or without substantially impacting the base replication process. In order to distinguish stub files representing migrated replication data from replicated stub files, priority tags or like identifiers can be used. Thus, when accessing a stub file on the destination system, such as to modify replication data or perform a restore process, the tagged stub files can be used to recall archived data prior to performing the requested operation so that an accurate copy of the source data is generated.

20 Claims, 8 Drawing Sheets

(56) References Cited

U.S. PATENT DOCUMENTS

| | | |
|---|---|---|
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi |
| 5,455,926 A | 10/1995 | Keele et al. |
| 5,487,072 A | 1/1996 | Kant |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,536 A | 8/1996 | Davis et al. |
| 5,555,404 A | 9/1996 | Torbjornsen et al. |
| 5,559,957 A | 9/1996 | Balk |
| 5,559,991 A | 9/1996 | Kanfi |
| 5,598,546 A | 1/1997 | Blomgren |
| 5,604,862 A | 2/1997 | Midgely et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,675,511 A | 10/1997 | Prasad et al. |
| 5,677,900 A | 10/1997 | Nishida et al. |
| 5,682,513 A | 10/1997 | Candelaria et al. |
| 5,687,343 A | 11/1997 | Fecteau et al. |
| 5,689,706 A | 11/1997 | Rao et al. |
| 5,699,361 A | 12/1997 | Ding et al. |
| 5,719,786 A | 2/1998 | Nelson et al. |
| 5,720,026 A | 2/1998 | Uemura et al. |
| 5,729,743 A | 3/1998 | Squibb |
| 5,737,747 A | 4/1998 | Vishlitsky et al. |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,860,104 A | 1/1999 | Witt et al. |
| 5,875,478 A | 2/1999 | Blumenau |
| 5,875,481 A | 2/1999 | Ashton et al. |
| 5,878,408 A | 3/1999 | Van Huben et al. |
| 5,887,134 A | 3/1999 | Ebrahim |
| 5,901,327 A | 5/1999 | Ofek |
| 5,907,621 A | 5/1999 | Bachman et al. |
| 5,907,672 A | 5/1999 | Matze et al. |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,991,779 A | 11/1999 | Bejar |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,021,475 A | 2/2000 | Nguyen et al. |
| 6,023,710 A | 2/2000 | Steiner et al. |
| 6,026,414 A | 2/2000 | Anglin |
| 6,049,889 A | 4/2000 | Steely, Jr. et al. |
| 6,052,735 A | 4/2000 | Ulrich et al. |
| 6,058,066 A | 5/2000 | Norris et al. |
| 6,061,692 A | 5/2000 | Thomas et al. |
| 6,072,490 A | 6/2000 | Bates et al. |
| 6,076,148 A | 6/2000 | Kedem et al. |
| 6,088,697 A | 7/2000 | Crockett et al. |
| 6,094,416 A | 7/2000 | Ying |
| 6,105,129 A | 8/2000 | Meier et al. |
| 6,112,239 A | 8/2000 | Kenner et al. |
| 6,122,668 A | 9/2000 | Teng et al. |
| 6,131,095 A | 10/2000 | Low et al. |
| 6,131,148 A | 10/2000 | West et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,158,044 A | 12/2000 | Tibbetts |
| 6,161,111 A | 12/2000 | Mutalik et al. |
| 6,163,856 A | 12/2000 | Dion et al. |
| 6,167,402 A | 12/2000 | Yeager |
| 6,175,829 B1 | 1/2001 | Li et al. |
| 6,195,695 B1 | 2/2001 | Cheston et al. |
| 6,205,450 B1 | 3/2001 | Kanome et al. |
| 6,212,512 B1 | 4/2001 | Barney et al. |
| 6,212,521 B1 | 4/2001 | Minami et al. |
| 6,230,164 B1 | 5/2001 | Rikieta et al. |
| 6,260,068 B1 | 7/2001 | Zalewski et al. |
| 6,260,069 B1 | 7/2001 | Anglin |
| 6,269,431 B1 | 7/2001 | Dunham |
| 6,275,953 B1 | 8/2001 | Vahalia et al. |
| 6,279,078 B1 | 8/2001 | Sicola et al. |
| 6,292,783 B1 | 9/2001 | Rohler |
| 6,301,592 B1 | 10/2001 | Aoyama et al. |
| 6,304,880 B1 | 10/2001 | Kishi |
| 6,311,193 B1 | 10/2001 | Sekido et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,363,464 B1 | 3/2002 | Mangione |
| 6,366,986 B1 | 4/2002 | St. Pierre et al. |
| 6,366,988 B1 | 4/2002 | Skiba et al. |
| 6,374,336 B1 | 4/2002 | Peters et al. |
| 6,374,363 B1 | 4/2002 | Wu et al. |
| 6,389,432 B1 | 5/2002 | Pothapragada et al. |
| 6,397,308 B1 | 5/2002 | Ofek et al. |
| 6,418,478 B1 | 7/2002 | Ignatius et al. |
| 6,421,711 B1 | 7/2002 | Blumenau et al. |
| 6,434,681 B1 | 8/2002 | Amangau |
| 6,438,595 B1 | 8/2002 | Blumenau et al. |
| 6,466,950 B1 | 10/2002 | Ono |
| 6,473,775 B1 | 10/2002 | Kusters et al. |
| 6,487,561 B1 | 11/2002 | Ofek et al. |
| 6,487,644 B1 | 11/2002 | Huebsch et al. |
| 6,487,645 B1 | 11/2002 | Clark et al. |
| 6,502,205 B1 | 12/2002 | Yanai et al. |
| 6,516,314 B1 | 2/2003 | Birkler et al. |
| 6,516,327 B1 | 2/2003 | Zondervan et al. |
| 6,516,348 B1 | 2/2003 | MacFarlane et al. |
| 6,519,679 B2 | 2/2003 | Devireddy et al. |
| 6,538,669 B1 | 3/2003 | Lagueux, Jr. et al. |
| 6,539,462 B1 | 3/2003 | Mikkelsen et al. |
| 6,542,468 B1 | 4/2003 | Hatakeyama |

(56) References Cited

U.S. PATENT DOCUMENTS

| | | |
|---|---|---|
| 6,542,909 B1 | 4/2003 | Tamer et al. |
| 6,542,972 B2 | 4/2003 | Ignatius et al. |
| 6,564,228 B1 | 5/2003 | O'Connor |
| 6,564,271 B2 | 5/2003 | Micalizzi, Jr. et al. |
| 6,581,143 B2 | 6/2003 | Gagne et al. |
| 6,604,118 B2 | 8/2003 | Kleinman et al. |
| 6,604,149 B1 | 8/2003 | Deo et al. |
| 6,611,849 B1 | 8/2003 | Raff et al. |
| 6,615,223 B1 | 9/2003 | Shih et al. |
| 6,629,189 B1 | 9/2003 | Sandstrom |
| 6,631,477 B1 | 10/2003 | LeCrone et al. |
| 6,631,493 B2 | 10/2003 | Ottesen et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,691,209 B1 | 2/2004 | O'Connell |
| 6,721,767 B2 | 4/2004 | De Meno et al. |
| 6,728,733 B2 | 4/2004 | Tokui |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,472 B1 | 9/2004 | Otterness et al. |
| 6,792,518 B2 | 9/2004 | Armangau et al. |
| 6,799,258 B1 | 9/2004 | Linde |
| 6,820,035 B1 | 11/2004 | Zahavi |
| 6,836,779 B2 | 12/2004 | Poulin |
| 6,839,724 B2 | 1/2005 | Manchanda et al. |
| 6,871,163 B2 | 3/2005 | Hiller et al. |
| 6,871,271 B2 | 3/2005 | Ohran et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,912,482 B2 | 6/2005 | Kaiser |
| 6,925,476 B1 | 8/2005 | Multer et al. |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,952,705 B2 | 10/2005 | Knoblock et al. |
| 6,952,758 B2 | 10/2005 | Chron et al. |
| 6,954,834 B2 | 10/2005 | Slater et al. |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,519 B1 | 2/2006 | Biettron et al. |
| 7,003,641 B2 | 2/2006 | Prahlad et al. |
| 7,032,131 B2 | 4/2006 | Lubbers et al. |
| 7,035,880 B1 | 4/2006 | Crescenti et al. |
| 7,039,661 B1 | 5/2006 | Ranade |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,068,597 B1 | 6/2006 | Fijolek et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,093,012 B2 | 8/2006 | Olstad et al. |
| 7,096,315 B2 | 8/2006 | Takeda et al. |
| 7,103,731 B2 | 9/2006 | Gibble et al. |
| 7,103,740 B1 | 9/2006 | Colgrove et al. |
| 7,106,691 B1 | 9/2006 | Decaluwe et al. |
| 7,107,298 B2 | 9/2006 | Prahlad et al. |
| 7,107,395 B1 | 9/2006 | Ofek et al. |
| 7,111,021 B1 | 9/2006 | Lewis et al. |
| 7,120,757 B2 | 10/2006 | Tsuge |
| 7,130,860 B2 | 10/2006 | Pachet |
| 7,130,970 B2 | 10/2006 | Devassy et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,158,985 B1 | 1/2007 | Liskov |
| 7,177,866 B2 | 2/2007 | Holenstein et al. |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,194,487 B1 | 3/2007 | Kekre et al. |
| 7,203,807 B2 | 4/2007 | Urabe et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,228,456 B2 | 6/2007 | Lecrone et al. |
| 7,231,391 B2 | 6/2007 | Aronoff et al. |
| 7,231,544 B2 | 6/2007 | Tan et al. |
| 7,234,115 B1 | 6/2007 | Sprauve et al. |
| 7,246,140 B2 | 7/2007 | Therrien et al. |
| 7,246,207 B2 | 7/2007 | Kottomtharayil |
| 7,257,689 B1 | 8/2007 | Baird |
| 7,269,612 B2 | 9/2007 | Devarakonda et al. |
| 7,269,641 B2 | 9/2007 | Powers et al. |
| 7,272,606 B2 | 9/2007 | Borthakur et al. |
| 7,275,138 B2 | 9/2007 | Saika |
| 7,275,177 B2 | 9/2007 | Amangau et al. |
| 7,278,142 B2 | 10/2007 | Bandhole et al. |
| 7,284,153 B2 | 10/2007 | Okbay et al. |
| 7,287,047 B2 | 10/2007 | Kavuri |
| 7,293,133 B1 | 11/2007 | Colgrove et al. |
| 7,296,125 B2 | 11/2007 | Ohran |
| 7,315,923 B2 | 1/2008 | Retnamma et al. |
| 7,318,134 B1 | 1/2008 | Oliveira et al. |
| 7,340,652 B2 | 3/2008 | Jarvis et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,363,444 B2 | 4/2008 | Ji |
| 7,370,232 B2 | 5/2008 | Safford |
| 7,373,364 B1 | 5/2008 | Chapman |
| 7,380,072 B2 | 5/2008 | Kottomtharayil et al. |
| 7,389,311 B1 | 6/2008 | Crescenti et al. |
| 7,392,360 B1 | 6/2008 | Aharoni et al. |
| 7,395,282 B1 | 7/2008 | Crescenti et al. |
| 7,401,064 B1 | 7/2008 | Arone et al. |
| 7,409,509 B2 | 8/2008 | Devassy et al. |
| 7,415,488 B1 | 8/2008 | Muth et al. |
| 7,428,657 B2 | 9/2008 | Yamasaki |
| 7,430,587 B2 | 9/2008 | Malone et al. |
| 7,433,301 B2 | 10/2008 | Akahane et al. |
| 7,440,982 B2 | 10/2008 | Lu et al. |
| 7,454,569 B2 | 11/2008 | Kavuri et al. |
| 7,461,230 B1 | 12/2008 | Gupta et al. |
| 7,464,236 B2 | 12/2008 | Sano et al. |
| 7,467,167 B2 | 12/2008 | Patterson |
| 7,467,267 B1 | 12/2008 | Mayock |
| 7,469,262 B2 | 12/2008 | Baskaran et al. |
| 7,472,238 B1 | 12/2008 | Gokhale |
| 7,472,312 B2 | 12/2008 | Jarvis et al. |
| 7,475,284 B2 | 1/2009 | Koike |
| 7,484,054 B2 | 1/2009 | Kottomtharayil |
| 7,490,207 B2 | 2/2009 | Amarendran |
| 7,496,589 B1 | 2/2009 | Jain et al. |
| 7,496,690 B2 | 2/2009 | Beverly et al. |
| 7,500,053 B1 | 3/2009 | Kavuri et al. |

(56) References Cited

U.S. PATENT DOCUMENTS

| | | |
|---|---|---|
| 7,500,150 B2 | 3/2009 | Sharma et al. |
| 7,502,902 B2 | 3/2009 | Sato |
| 7,509,316 B2 | 3/2009 | Greenblatt et al. |
| 7,512,601 B2 | 3/2009 | Cucerzan et al. |
| 7,516,088 B2 | 4/2009 | Johnson et al. |
| 7,519,726 B2 | 4/2009 | Palliyll et al. |
| 7,523,483 B2 | 4/2009 | Dogan |
| 7,529,745 B2 | 5/2009 | Ahluwalia et al. |
| 7,529,748 B2 | 5/2009 | Wen et al. |
| 7,529,782 B2 | 5/2009 | Prahlad et al. |
| 7,529,898 B2 | 5/2009 | Nguyen et al. |
| 7,532,340 B2 | 5/2009 | Koppich et al. |
| 7,533,181 B2 | 5/2009 | Dawson et al. |
| 7,536,291 B1 | 5/2009 | Retnamma et al. |
| 7,539,707 B2 | 5/2009 | Prahlad et al. |
| 7,539,835 B2 | 5/2009 | Kaiser |
| 7,543,125 B2 | 6/2009 | Gokhale |
| 7,546,324 B2 | 6/2009 | Prahlad et al. |
| 7,546,364 B2 | 6/2009 | Raman et al. |
| 7,565,572 B2 | 7/2009 | Yamasaki |
| 7,581,077 B2 | 8/2009 | Ignatius et al. |
| 7,593,966 B2 | 9/2009 | Therrien et al. |
| 7,596,586 B2 | 9/2009 | Gokhale et al. |
| 7,606,841 B1 | 10/2009 | Ranade |
| 7,606,844 B2 | 10/2009 | Kottomtharayil |
| 7,613,748 B2 | 11/2009 | Brockway et al. |
| 7,613,750 B2 | 11/2009 | Valiyaparambil et al. |
| 7,617,253 B2 | 11/2009 | Prahlad et al. |
| 7,617,262 B2 | 11/2009 | Prahlad et al. |
| 7,617,321 B2 | 11/2009 | Clark |
| 7,617,369 B1 | 11/2009 | Bezbaruah et al. |
| 7,617,541 B2 | 11/2009 | Plotkin et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,668,798 B2 | 2/2010 | Scanlon et al. |
| 7,669,029 B1 | 2/2010 | Mishra et al. |
| 7,685,126 B2 | 3/2010 | Patel et al. |
| 7,689,467 B1 | 3/2010 | Belanger et al. |
| 7,702,533 B2 | 4/2010 | Barnard et al. |
| 7,702,670 B1 | 4/2010 | Duprey et al. |
| 7,707,184 B1 | 4/2010 | Zhang et al. |
| 7,716,171 B2 | 5/2010 | Kryger |
| 7,734,715 B2 | 6/2010 | Hyakutake et al. |
| 7,739,235 B2 | 6/2010 | Rousseau et al. |
| 7,810,067 B2 | 10/2010 | Kaelicke et al. |
| 7,831,553 B2 | 11/2010 | Prahlad et al. |
| 7,831,622 B2 | 11/2010 | Prahlad et al. |
| 7,840,533 B2 | 11/2010 | Prahlad et al. |
| 7,840,537 B2 | 11/2010 | Gokhale et al. |
| 7,870,355 B2 | 1/2011 | Erofeev |
| 7,904,681 B1 | 3/2011 | Bappe |
| 7,930,476 B1 | 4/2011 | Castelli et al. |
| 7,962,709 B2 | 6/2011 | Agrawal |
| 8,005,795 B2 | 8/2011 | Galipeau et al. |
| 8,024,294 B2 | 9/2011 | Kottomtharayil |
| 8,190,565 B2 | 5/2012 | Prahlad et al. |
| 8,195,623 B2 | 6/2012 | Prahlad et al. |
| 8,204,859 B2 | 6/2012 | Ngo |
| 8,285,684 B2 | 10/2012 | Prahlad et al. |
| 8,352,422 B2 | 1/2013 | Prahlad et al. |
| 8,463,751 B2 | 6/2013 | Kottomtharayil |
| 8,489,656 B2 | 7/2013 | Erofeev |
| 8,504,515 B2 | 8/2013 | Prahlad et al. |
| 8,504,517 B2 | 8/2013 | Agrawal |
| 8,572,038 B2 | 10/2013 | Erofeev |
| 8,589,347 B2 | 11/2013 | Erofeev |
| 2001/0029512 A1 | 10/2001 | Oshinsky et al. |
| 2001/0029517 A1 | 10/2001 | De Meno et al. |
| 2001/0032172 A1 | 10/2001 | Moulinet et al. |
| 2001/0035866 A1 | 11/2001 | Finger et al. |
| 2001/0042222 A1 | 11/2001 | Kedem et al. |
| 2001/0044807 A1 | 11/2001 | Kleiman et al. |
| 2002/0002557 A1 | 1/2002 | Straube et al. |
| 2002/0004883 A1 | 1/2002 | Nguyen et al. |
| 2002/0019909 A1 | 2/2002 | D'Errico |
| 2002/0023051 A1 | 2/2002 | Kunzle et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0062230 A1 | 5/2002 | Morag et al. |
| 2002/0069324 A1 | 6/2002 | Gerasimov et al. |
| 2002/0083055 A1 | 6/2002 | Pachet et al. |
| 2002/0091712 A1 | 7/2002 | Martin et al. |
| 2002/0103848 A1 | 8/2002 | Giacomini et al. |
| 2002/0107877 A1 | 8/2002 | Whiting et al. |
| 2002/0112134 A1 | 8/2002 | Ohran et al. |
| 2002/0120741 A1 | 8/2002 | Webb et al. |
| 2002/0124137 A1 | 9/2002 | Ulrich et al. |
| 2002/0133511 A1 | 9/2002 | Hostetter et al. |
| 2002/0133512 A1 | 9/2002 | Milillo et al. |
| 2002/0161753 A1 | 10/2002 | Inaba et al. |
| 2002/0174107 A1 | 11/2002 | Poulin |
| 2002/0174416 A1 | 11/2002 | Bates et al. |
| 2002/0181395 A1 | 12/2002 | Foster et al. |
| 2003/0005119 A1 | 1/2003 | Mercier et al. |
| 2003/0018657 A1 | 1/2003 | Monday |
| 2003/0023893 A1 | 1/2003 | Lee et al. |
| 2003/0028736 A1 | 2/2003 | Berkowitz et al. |
| 2003/0033308 A1 | 2/2003 | Patel et al. |
| 2003/0061491 A1 | 3/2003 | Jaskiewicz et al. |
| 2003/0079018 A1 | 4/2003 | Lolayekar et al. |
| 2003/0097296 A1 | 5/2003 | Putt |
| 2003/0126200 A1 | 7/2003 | Wolff |
| 2003/0131278 A1 | 7/2003 | Fujibayashi |
| 2003/0135783 A1 | 7/2003 | Martin et al. |
| 2003/0161338 A1 | 8/2003 | Ng et al. |
| 2003/0167380 A1 | 9/2003 | Green et al. |
| 2003/0177149 A1 | 9/2003 | Coombs |
| 2003/0177321 A1 | 9/2003 | Watanabe |
| 2003/0187847 A1 | 10/2003 | Lubbers et al. |
| 2003/0225800 A1 | 12/2003 | Kavuri |
| 2004/0006572 A1 | 1/2004 | Hoshino et al. |
| 2004/0006578 A1 | 1/2004 | Yu |
| 2004/0010487 A1 | 1/2004 | Prahlad et al. |
| 2004/0015468 A1 | 1/2004 | Beier et al. |
| 2004/0039679 A1 | 2/2004 | Norton et al. |
| 2004/0078632 A1 | 4/2004 | Infante et al. |
| 2004/0098425 A1 | 5/2004 | Wiss et al. |
| 2004/0107199 A1 | 6/2004 | Dairymple et al. |
| 2004/0117438 A1 | 6/2004 | Considine et al. |
| 2004/0117572 A1 | 6/2004 | Welsh et al. |
| 2004/0133634 A1 | 7/2004 | Luke et al. |
| 2004/0139128 A1 | 7/2004 | Becker et al. |
| 2004/0193625 A1 | 9/2004 | Sutoh |
| 2004/0193953 A1 | 9/2004 | Callahan et al. |
| 2004/0205206 A1 | 10/2004 | Naik et al. |
| 2004/0225437 A1 | 11/2004 | Endo et al. |
| 2004/0230829 A1 | 11/2004 | Dogan et al. |
| 2004/0236958 A1 | 11/2004 | Teicher et al. |
| 2004/0249883 A1 | 12/2004 | Srinivasan et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267777 A1 | 12/2004 | Sugimura et al. |
| 2004/0267835 A1 | 12/2004 | Zwilling et al. |
| 2004/0267836 A1 | 12/2004 | Amangau et al. |
| 2005/0027892 A1 | 2/2005 | McCabe et al. |
| 2005/0033800 A1 | 2/2005 | Kavuri et al. |
| 2005/0044114 A1 | 2/2005 | Kottomtharayil et al. |
| 2005/0060613 A1 | 3/2005 | Cheng |
| 2005/0080928 A1 | 4/2005 | Beverly et al. |
| 2005/0086443 A1 | 4/2005 | Mizuno et al. |
| 2005/0108292 A1 | 5/2005 | Burton et al. |
| 2005/0114406 A1 | 5/2005 | Borthakur et al. |
| 2005/0131900 A1 | 6/2005 | Palliyll et al. |
| 2005/0138306 A1 | 6/2005 | Panchbudhe et al. |
| 2005/0144202 A1 | 6/2005 | Chen |
| 2005/0172073 A1 | 8/2005 | Voigt |

(56) References Cited

U.S. PATENT DOCUMENTS

| | | |
|---|---|---|
| 2005/0187982 A1 | 8/2005 | Sato |
| 2005/0187992 A1 | 8/2005 | Prahlad et al. |
| 2005/0188109 A1 | 8/2005 | Shiga et al. |
| 2005/0188254 A1 | 8/2005 | Urabe et al. |
| 2005/0193026 A1 | 9/2005 | Prahlad et al. |
| 2005/0198083 A1 | 9/2005 | Saika et al. |
| 2005/0228875 A1 | 10/2005 | Monitzer et al. |
| 2005/0246376 A1 | 11/2005 | Lu et al. |
| 2005/0246510 A1 | 11/2005 | Retnamma et al. |
| 2005/0254456 A1 | 11/2005 | Sakai |
| 2005/0268068 A1 | 12/2005 | Ignatius et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0010341 A1 | 1/2006 | Kodama |
| 2006/0020616 A1 | 1/2006 | Hardy et al. |
| 2006/0034454 A1 | 2/2006 | Damgaard et al. |
| 2006/0047805 A1 | 3/2006 | Byrd et al. |
| 2006/0047931 A1 | 3/2006 | Saika |
| 2006/0092861 A1 | 5/2006 | Corday et al. |
| 2006/0107089 A1 | 5/2006 | Jansz et al. |
| 2006/0120401 A1 | 6/2006 | Harada et al. |
| 2006/0129537 A1 | 6/2006 | Torii et al. |
| 2006/0136685 A1 | 6/2006 | Griv et al. |
| 2006/0155946 A1 | 7/2006 | Ji |
| 2006/0171315 A1 | 8/2006 | Choi et al. |
| 2006/0174075 A1 | 8/2006 | Sutoh |
| 2006/0215564 A1 | 9/2006 | Breitgand et al. |
| 2006/0230244 A1 | 10/2006 | Amarendran et al. |
| 2006/0242371 A1 | 10/2006 | Shono et al. |
| 2006/0242489 A1 | 10/2006 | Brockway et al. |
| 2007/0033437 A1 | 2/2007 | Kawamura |
| 2007/0043956 A1 | 2/2007 | El Far et al. |
| 2007/0050547 A1 | 3/2007 | Sano |
| 2007/0055737 A1 | 3/2007 | Yamashita et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0113006 A1 | 5/2007 | Elliott et al. |
| 2007/0124347 A1 | 5/2007 | Vivian et al. |
| 2007/0124348 A1 | 5/2007 | Claborn et al. |
| 2007/0130373 A1 | 6/2007 | Kalwitz |
| 2007/0143371 A1 | 6/2007 | Kottomtharayil |
| 2007/0143756 A1 | 6/2007 | Gokhale |
| 2007/0179990 A1* | 8/2007 | Zimran et al. ............... 707/201 |
| 2007/0183224 A1 | 8/2007 | Erofeev |
| 2007/0185852 A1 | 8/2007 | Erofeev |
| 2007/0185937 A1 | 8/2007 | Prahlad et al. |
| 2007/0185938 A1 | 8/2007 | Prahlad et al. |
| 2007/0185939 A1 | 8/2007 | Prahlad et al. |
| 2007/0185940 A1 | 8/2007 | Prahlad et al. |
| 2007/0186042 A1 | 8/2007 | Kottomtharayil et al. |
| 2007/0186068 A1 | 8/2007 | Agrawal |
| 2007/0198602 A1 | 8/2007 | Ngo et al. |
| 2007/0226438 A1 | 9/2007 | Erofeev |
| 2007/0244571 A1 | 10/2007 | Wilson et al. |
| 2007/0260609 A1 | 11/2007 | Tulyani |
| 2007/0276848 A1 | 11/2007 | Kim |
| 2007/0288536 A1 | 12/2007 | Sen et al. |
| 2008/0016126 A1 | 1/2008 | Kottomtharayil et al. |
| 2008/0016293 A1 | 1/2008 | Saika |
| 2008/0028009 A1 | 1/2008 | Ngo |
| 2008/0059515 A1 | 3/2008 | Fulton |
| 2008/0077634 A1 | 3/2008 | Quakenbush |
| 2008/0103916 A1 | 5/2008 | Camarador et al. |
| 2008/0104357 A1 | 5/2008 | Kim et al. |
| 2008/0114815 A1 | 5/2008 | Sutoh |
| 2008/0147878 A1 | 6/2008 | Kottomtharayil et al. |
| 2008/0183775 A1 | 7/2008 | Prahlad et al. |
| 2008/0205301 A1 | 8/2008 | Burton et al. |
| 2008/0208933 A1 | 8/2008 | Lyon |
| 2008/0228987 A1 | 9/2008 | Yagi |
| 2008/0229037 A1 | 9/2008 | Bunte et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0244177 A1 | 10/2008 | Crescenti et al. |
| 2008/0244205 A1 | 10/2008 | Amano et al. |
| 2008/0250178 A1 | 10/2008 | Haustein et al. |
| 2008/0306954 A1 | 12/2008 | Hornqvist |
| 2008/0313497 A1 | 12/2008 | Hirakawa |
| 2009/0013014 A1 | 1/2009 | Kern |
| 2009/0044046 A1 | 2/2009 | Yamasaki |
| 2009/0113056 A1 | 4/2009 | Tameshige et al. |
| 2009/0150462 A1* | 6/2009 | McClanahan et al. ........ 707/204 |
| 2009/0182963 A1 | 7/2009 | Prahlad et al. |
| 2009/0187944 A1 | 7/2009 | White et al. |
| 2009/0300079 A1 | 12/2009 | Shitomi |
| 2009/0319534 A1 | 12/2009 | Gokhale |
| 2009/0319585 A1 | 12/2009 | Gokhale |
| 2010/0005259 A1 | 1/2010 | Prahlad |
| 2010/0049753 A1 | 2/2010 | Prahlad et al. |
| 2010/0094808 A1 | 4/2010 | Erofeev |
| 2010/0100529 A1 | 4/2010 | Erofeev |
| 2010/0122053 A1 | 5/2010 | Prahlad et al. |
| 2010/0131461 A1 | 5/2010 | Prahlad et al. |
| 2010/0131467 A1 | 5/2010 | Prahlad et al. |
| 2010/0145909 A1 | 6/2010 | Ngo |
| 2010/0153338 A1 | 6/2010 | Ngo et al. |
| 2010/0179941 A1 | 7/2010 | Agrawal et al. |
| 2010/0205150 A1 | 8/2010 | Prahlad et al. |
| 2010/0211571 A1 | 8/2010 | Prahlad et al. |
| 2011/0066599 A1 | 3/2011 | Prahlad et al. |
| 2011/0238621 A1 | 9/2011 | Agrawal |
| 2011/0246416 A1 | 10/2011 | Prahlad et al. |
| 2011/0246430 A1 | 10/2011 | Prahlad et al. |
| 2012/0011336 A1 | 1/2012 | Saika |
| 2012/0030171 A1 | 2/2012 | Kottomtharayil |
| 2012/0317074 A1 | 12/2012 | Ngo |
| 2013/0006926 A1 | 1/2013 | Erofeev |
| 2013/0006938 A1 | 1/2013 | Prahlad et al. |
| 2013/0006942 A1 | 1/2013 | Prahlad et al. |
| 2013/0254166 A1 | 9/2013 | Kottomtharayil |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| EP | 1974296 | 10/2008 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 200347811 | 12/2000 |
| WO | WO 93/03549 | 2/1993 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 02/095632 | 11/2002 |
| WO | WO 03/028183 | 4/2003 |
| WO | WO 2004/034197 | 4/2004 |
| WO | WO 2005/055093 | 6/2005 |
| WO | WO 2005/086032 | 9/2005 |
| WO | WO 2007/053314 | 5/2007 |
| WO | WO 2007/075587 | 7/2007 |
| WO | WO 2010/068570 | 6/2010 |

(56) References Cited

FOREIGN PATENT DOCUMENTS

OTHER PUBLICATIONS

Armstead et al., "Implementation of a Campus-Wide Distributed Mass Storage Service: The Dream vs. Reality," IEEE, 1995, pp. 190-199.
Arneson, "Development of Omniserver; Mass Storage Systems," Control Data Corporation, 1990, pp. 88-93.
Arneson, "Mass Storage Archiving in Network Environments" IEEE, 1998, pp. 45-50.
Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Canadian Office Action dated Dec. 29, 2010, Application No. CA2546304.
Eitel, "Backup and Storage Management in Distributed Heterogeneous Environments," IEEE, 1994, pp. 124-126.
European Examination Report; Application No. 06848901.2, Apr. 1, 2009, pp. 7.
Examiner's Report for Australian Application No. 2003279847, Dated Dec. 9, 2008, 4 pages.
Final Office Action for Japanese Application No. 2003531581, Mail Date Mar. 24, 2009, 6 pages.
First Office Action for Japanese Application No. 2003531581, Mail Date Jul. 8, 2008, 8 pages.
Gait, "The Optical File Cabinet: A Random-Access File system for Write-Once Optical Disks," IEEE Computer, vol. 21, No. 6, pp. 11-22 (1988).
Gray (#1 of 2, pp. 646-655), Jim; Reuter, Andreas, Transaction Processing: Concepts and Techniques, Morgan Kaufmann Publisher, USA 1994, 1994, pp. 646-655.
Gray (#2 of 2, pp. 604-609), Jim; Reuter Andreas, Transaction Processing Concepts and Techniques, Morgan Kaufmann Publisher, USA 1994, pp. 604-609.
http://en.wikipedia.org/wiki/Naive_Bayes_classifier.
International Search Report and Written Opinion dated Jan. 11, 2006, PCT/US2004/038455.
International Search Report and Written Opinion dated Mar. 25, 2010, PCT/US2009/066880.
International Search Report and Written Opinion dated Nov. 13, 2009, PCT/US2007/081681.
International Search Report dated Dec. 28, 2009, PCT/US2004/038324.
International Search Report dated May 15, 2007, PCT/US2006/048273.
Jander, "Launching Storage-Area Net," Data Communications, US, McGraw Hill, NY, vol. 27, No. 4(Mar. 21, 1998), pp. 64-72.
Lyon J., Design considerations in replicated database systems for disaster protection, COMPCON 1988, Feb. 29, 1988, pp. 428-430.
Microsoft Corporation, "Microsoft Exchange Server: Best Practices for Exchange Database Management," 1998.
Rosenblum et al., "The Design and Implementation of a Log-Structure File System," Operating Systems Review SIGOPS, vol. 25, No. 5, New York, US, pp. 1-15 (May 1991).
Second Examination Report in EU Appl. No. 06 848 901.2-2201 dated Dec. 3, 2010.
The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009.
Veritas Software Corporation, "Veritas Volume Manager 3.2, Administrator's Guide," Aug. 2001, 360 pages.
Wiesmann M, Database replication techniques: a three parameter classification, Oct. 16, 2000, pp. 206-215.
Examiner's First Report; Application No. 2006331932 May 11, 2011 in 2 pages.
Final Office Action for U.S. Appl. No. 12/407,906, mail date Jul. 11, 2011, 38 pages.
Gray, et al. "Transaction processing: concepts and techniques" 1994, Morgan Kaufmann Publishers, USA, pp. 604-609, 646-655.
International Preliminary Report on Patentability, PCT Application No. PCT/US2009/066880, mailed Jun. 23, 2011, in 9 pages.
Notice of Allowance for U.S. Appl. No. 12/581,297, Mail Date May 13, 2011, 23 pages.
Notice of Allowance for U.S. Appl. No. 12/951,773, Mail Date Oct. 4, 2011, 8 pages.
First Office Action in Canadian application No. 2,632,935 dated Feb. 16, 2012, in 5 pages.
Harrington, "The RFP Process: How to Hire a Third Party", Transportation & Distribution, Sep. 1988, vol. 39, Issue 9, in 5 pages.
Harrington, Lisa H., "The RFP Process: How to Hire a Third Party", Transportation & Distribution, Sep. 1988, vol. 39, Issue 9, in 5 pages.
International Search Report and Written Opinion issued in PCT Application No. PCT/US2011/38436, mailed Sep. 21, 2011, in 18 pages.
International Search Report from International Application No. PCT/US2006/048273, dated May 15, 2007.
Kashyap, et al., "Professional Services Automation: A knowledge Management approach using LSI and Domain specific Ontologies", FLAIRS-01 Proceedings, 2001, pp. 300-302.
Arneson, David A., Control Data Corporation, Development of Omniserver; Mass Storage Systems, 1990, pp. 88-93.
Calvert, Andrew, "SQL Server 2005 Snapshots", published Apr. 3, 2006, http:/www.simple-talk.com/contnet/print.aspx?article=137, 6 pages.
Canadian Office Action dated Sep. 24, 2012, Application No. 2,632,935, 2 pages.
International Search Report and Written Opinion issued in PCT Application No. PCT/US2011/030396, mailed Jul. 18, 2011, in 20 pages.
International Preliminary Report on Patentability and Written Opinion in PCT/US2011/030396 mailed Oct. 2, 2012.
International Preliminary Report on Patentability and Written Opinion in PCT/US2011/038436 mailed Dec. 4, 2012.
International Search Report dated Dec. 28, 2009, PCT/US204/038324.
U.S. Appl. No. 12/750,067, Stubbing Systems and Methods in a Data Replication Environment, filed Mar. 30, 2010.
U.S. Appl. No. 12/749,953, Data Restore Systems and Methods in a Replication Environment, filed Mar. 30, 2010.
U.S. Appl. No. 13/955,445, Stubbing Systems and Methods in a Data Replication Environment, filed Jul. 31, 2013.
U.S. Appl. No. 14/038,540, filed Sep. 26, 2013, Erofeev.
IBM, "Intelligent Selection of Logs Required During Recovery Processing", ip.com, Sep. 16, 2002, 4 pages.
IBM, "Near Zero Impact Backup and Data Replication Appliance", ip.com, Oct. 18, 2004, 5 pages.
Park, et al., "An Efficient Logging Scheme for Recoverable Distributed Shared Memory Systems", IEEE, 1997, 9 pages.
Exam Report in Australian Application No. 2009324800 dated Jun. 17, 2013.

\* cited by examiner

ID-27215699

STUB FILE PRIORITIZATION IN A DATA REPLICATION SYSTEM

RELATED APPLICATIONS

This application is related to the following U.S. patent applications filed on even date herewith, each of which is hereby incorporated herein by reference in its entirety:

U.S. application Ser. No. 12/750,067, entitled "Stubbing Systems and Methods in a Data Replication Environment"; and U.S. application Ser. No. 12/749,953, entitled "Data Restore Systems and Methods in a Replication Environment".

BACKGROUND

1. Field

The present disclosure relates to performing copy and/or data management operations in a computer network and, in particular, to systems and methods for managing stub files in a data replication system.

2. Description of the Related Art

Computers have become an integral part of business operations such that many banks, insurance companies, brokerage firms, financial service providers, and a variety of other businesses rely on computer networks to store, manipulate, and display information that is constantly subject to change. Oftentimes, the success or failure of an important transaction may turn on the availability of information that is both accurate and current. Accordingly, businesses worldwide recognize the commercial value of their data and seek reliable, cost-effective ways to protect the information stored on their computer networks.

To address the need to maintain current copies of electronic information, certain data replication systems have been provided to "continuously" copy data from one or more source machines to one or more destination machines. These continuous data replication (CDR) systems provide several advantages for disaster recovery solutions and can substantially reduce the amount of data that is lost during an unanticipated system failure.

One drawback of such CDR systems is that synchronization of the source and destination machines generally requires the same amount of storage space on both the source and destination. Thus, not only do many conventional CDR systems require large amounts of disk space, but they also tend to be less useful for general data backup purposes.

SUMMARY

In view of the foregoing, a need exists for improved systems and methods for the managing replication data in a storage system, such as a CDR system. For example, there is a need for conserving disk space on a destination storage device, while maintaining the ability to provide sufficient and timely recovery of the replicated data. Moreover, there is a need for providing user access to the replicated data in a manner that is transparent to the user and/or without substantially impacting the CDR, or other replication, process.

In certain embodiments of the invention disclosed herein, stubbing systems and methods are provided for destination storage devices in a CDR system. For instance, data on a destination storage device can be selectively moved to secondary storage based on archive, de-duplication, or other storage policies, to free up space on the destination system.

For example, certain embodiments of the invention involve the de-duplication, or single-instancing, of replication data. In such systems, de-duplicated data blocks on the replication storage device can be replaced with substantially smaller stub files that serve as pointers to, or placeholders for, the actual data. In certain embodiments, a data migration module of the replication system periodically examines the replication data to identify common blocks that have not been accessed for a period of time and that can be replaced by smaller stub files, while a copy of the actual data is archived to secondary storage, such as a less-expensive medium or the like.

In order to distinguish the stub files representing migrated replication data from original stub files that have been replicated from the source system, certain embodiments of the invention use priority tags. Thus, when accessing a stub file on the destination system, such as to modify the replication data or to perform a system restore process, the tagged stub files can be used to recall the archived data prior to performing the requested operation so that an accurate replica of the source data can be compiled.

Certain embodiments of the invention include a method for performing data management operations on replicated data of a destination storage device. The method includes processing, with one or more routines, at least one log file having a plurality of log entries indicative of operations generated by a computer application executing on a source system, the operations being directed to data on a source storage device. The method further includes replaying, with the one or more routines, the operations on a destination storage device to modify replication data on the destination storage device, wherein said replaying further comprises: (i) identifying a plurality of stub files within the replication data, wherein the plurality of stub files comprises one or more first stub files each comprising a predetermined tag value, and wherein the plurality of stub files further comprises one or more second stub files that do not comprise the predetermined tag value; (ii) for each of the one or more first stub files, recalling from a secondary storage one or more data objects represented by each of the one or more first stub files and replacing each of the one or more first stub files with the corresponding data object prior to modifying the replication data; and (iii) modifying the replication data on the destination storage device to match the data on the source storage device.

Certain embodiments of the invention further include a destination system for performing data replication in a computer network. The destination system comprises a destination storage device, at least one replication log file, a replication module and a migration module. The destination storage device stores replication data having a plurality of stub files, the plurality of stub files comprising one or more first stub files each having at least one predetermined tag value and one or more second stub files that do not have the at least one predetermined tag value. The at least one replication log file comprises a plurality of log entries indicative of data operations generated by a computer application for execution on a source storage device. A replication module traverses the plurality of log entries in the replication log file(s) and copies the log entries to execute the data operations on replication data of the destination storage device. The migration module restores copied data from a secondary storage device to the destination storage device based on the one or more first stub files. In certain embodiments, the replication module is further configured to identify the first stub file(s) and instruct the migration module to replace the first stub file(s) with the copied data from the secondary storage device prior to executing the data operations on the replication data.

In certain embodiments, a destination system is disclosed for performing data replication in a computer network. The destination system comprises means for storing replication data having a plurality of stub files, the plurality of stub files comprising one or more first stub files each comprising at least one predetermined tag value and one or more second stub files that do not comprise the at least one predetermined tag value. The system further includes means for receiving a plurality of log entries indicative of data operations generated by a computer application for execution on a source storage device, and means for traversing the plurality of log entries in the receiving means and for copying the log entries to execute the data operations on replication data of the storing means. The system further includes means for restoring copied data from a secondary storage device to the storing means based on the first stub file(s). Furthermore, the traversing means can identify the first stub file(s) and instruct the restoring means to replace the first stub file(s) with the copied data from the secondary storage device prior to executing the data operations on the replication data.

In certain embodiments, a method is disclosed for performing data management operations in a computer network. The method includes monitoring operations associated with a source computing device, the operations operative to write data to a source storage device. The method further includes copying the data to a destination storage device based at least in part on the operations, the data comprising at least one first stub file, and scanning the data of the destination storage device to identify a common data object repeated between multiple portions of the data on the destination storage device. The method also includes archiving a copy of the common data object on a second storage device and determining a last access time of each of the multiple data portions of the destination storage device having the common data object. For each of the multiple data portions having a last access time at or before the time of the archiving of the copy of the common data object, the method includes replacing the common data object of the particular data portion with a second stub file, wherein the second stub file comprises a tag value not possessed by any of the first stub file(s), and wherein the second stub file comprises information indicative of a location of the copy of the common data object.

In further embodiments, a continuous data replication system is disclosed that comprises a first storage device, at least one monitoring module, a replication module and a migration module. The first storage device stores data write operations from at least one computer application at a first location, the first location comprising at least one first stub file. The at least one module monitors the data write operations and generates first log entries based on the data write operations. The second storage device comprises second log entries, wherein the second log entries comprise copies of at least a portion of the first log entries. The replication module is in communication with the second storage device and is configured to process the second log entries to modify replicated data stored in a second location to substantially mirror the data of the first location, the replicated data comprising a copy of the first stub file(s). The migration module is configured to archive select data objects of the replicated data to a third location and to replace each of the select data objects of the replicated data with a second stub file, wherein each of the second stub files comprises an identifier not possessed by the first stub file(s) and wherein each of the second stub files comprises information indicative of a location of the archived copy of the data object at the third location.

In certain embodiments a continuous data replication system is disclosed that comprises means for storing data write operations from at least one computer application at a first location, the first location comprising at least one first stub file. The replication system further includes means for monitoring the data write operations and for generating first log entries based on the data write operations and also means for receiving second log entries, wherein the second log entries comprise copies of at least a portion of the first log entries. The replication system further includes means for processing the second log entries to modify replicated data stored in a second location to substantially mirror the data of the first location, the replicated data comprising a copy of the first stub file(s), and means for archiving select data objects of the replicated data to a third location and for replacing each of the select data objects of the replicated data with a second stub file, wherein each of the second stub files comprises an identifier not possessed by the first stub file(s) and wherein each of the second stub files comprises information indicative of a location of the archived copy of the data object at the third location.

In certain further embodiments, a method is disclosed for restoring data in a continuous data replication system. The method includes receiving, with a first computing device, a request to restore data of one or more snapshots of replication data of a destination storage device, the replication data having first stub files replicated from a source system and second stub files indicative of select data blocks of the replication data copied to a secondary storage device from the destination storage device. The method further includes mounting the snapshot(s); identifying the second stub files captured by the snapshot(s); and recalling to a staging area the select data blocks from the secondary storage device corresponding to each of the identified second stub files. In addition, the method includes, following said recalling, restoring the replication data from the snapshot(s), the restored data comprising each of the first stub files and comprising none of the second stub files.

In certain embodiments, a system is disclosed for restoring data in a continuous data replication environment. The system includes a first storage device comprising data replicated from a source storage system, the replicated data comprising first stub files replicated from the source storage system and second stub files indicative of select data blocks of the replicated data copied to a secondary storage device. The system also includes a restore module configured to mount a snapshot of the replicated data, the snapshot representing a point-in-time image of the replicated data, wherein the restore module is further configured to identify the second stub files captured by the snapshot(s). The system further includes a migration module in communication with the restore module, the migration module being configured to recall to a staging area the select data blocks from the secondary storage device corresponding to each of the identified second stub files. Moreover, in certain embodiments, the restore module is configured to restore the replication data represented by the snapshot, the restored data comprising each of the first stub files and comprising none of the second stub files.

In certain embodiments, a system is disclosed for restoring data in a continuous data replication environment. The system comprises means for storing data replicated from a source storage system, the replicated data comprising first stub files replicated from the source storage system and second stub files indicative of select data blocks of the replicated data copied to a secondary storage device. The system also comprises means for mounting a snapshot of the replicated data, the snapshot representing a point-in-time image of the replicated data, wherein the mounting means further identifies the second stub files captured by the one or more snapshots.

Moreover, the system comprises means for recalling to a staging area the select data blocks from the secondary storage device corresponding to each of the identified second stub files, and wherein the mounting means further restores the replication data represented by the snapshot, the restored data comprising each of the first stub files and comprising none of the second stub files.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 4 illustrates a flowchart of an exemplary embodiment of a scan process of the de-duplication method; FIG. 5 illustrates a flowchart of an exemplary embodiment of an archive process of the de-duplication method; and FIG. 6 illustrates a flowchart of an exemplary embodiment of a stubbing process of the de-duplication method.

DETAILED DESCRIPTION OF THE PREFERRED EMBODIMENTS

Figure 1:
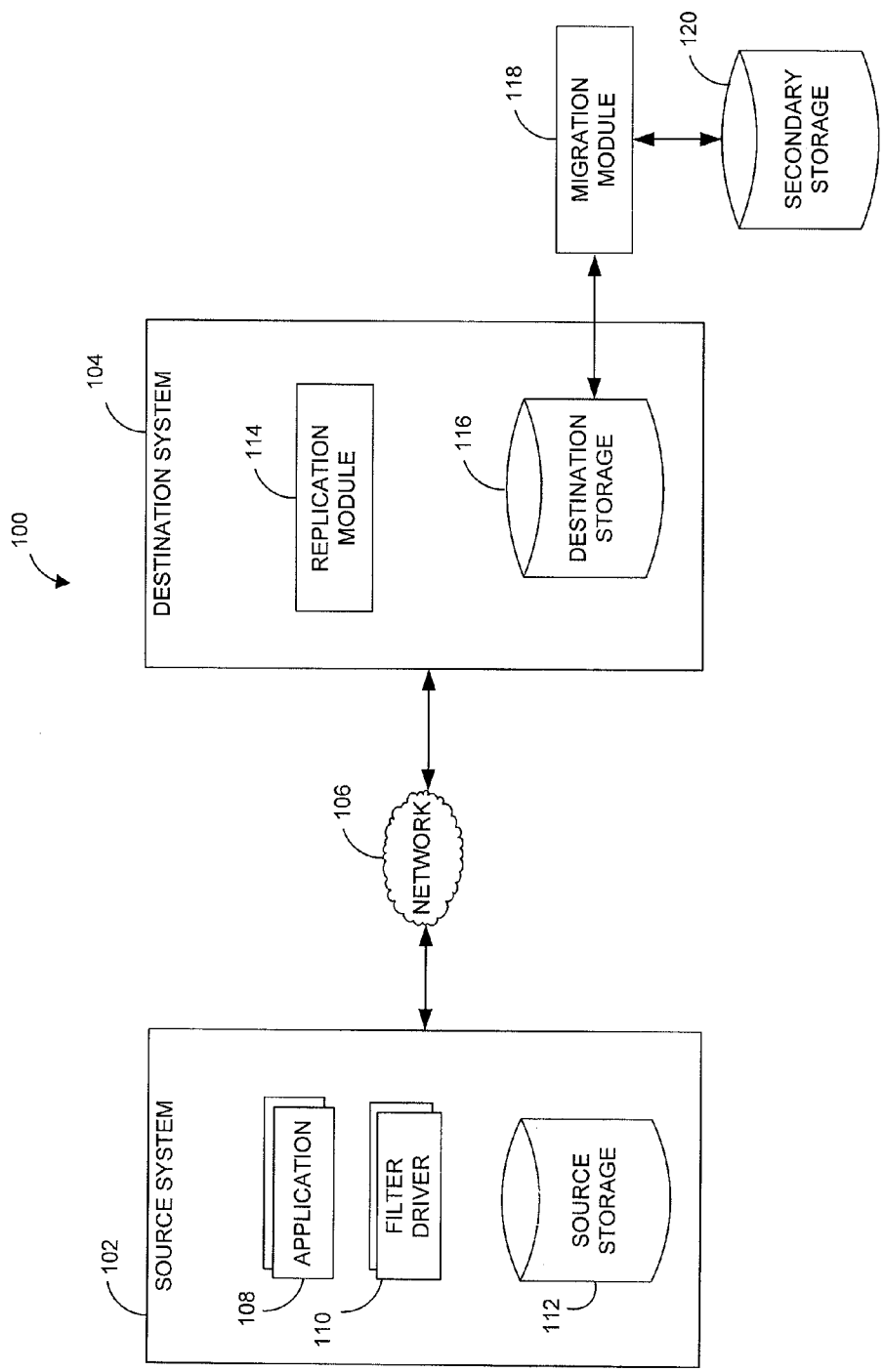
FIG. 1 illustrates a block diagram of a data replication system, according to certain embodiments of the invention.

As will be seen from the disclosure herein, systems and methods are provided for intelligent and efficient data management. For instance, certain embodiments of the invention provide for improved CDR systems that reduce the amount of space required for replication data on a destination system. Such systems can utilize stub files or the like to replace migrated, de-duplicated or otherwise copied data that has been moved from the destination system to secondary storage. Disclosed systems and methods further provide access to the replication data in a manner that is transparent to the user and/or without substantially impacting the CDR, or like replication, process.

In certain examples, embodiments of the invention are directed to the de-duplication, or single-instancing, of replication data. In such systems, de-duplicated data blocks on the destination storage device can be replaced with stub files that serve as pointers to the storage locations of the actual data. For instance, like stub files can be used to reference the same common data block that has been de-duplicated from the destination system. In certain embodiments, a migration module on the destination system periodically examines the replication data to identify the common data blocks that have not been accessed for a period of time and that can be replaced by the smaller stub file, while a copy of the actual data is archived to secondary storage.

In order to distinguish stub files representing migrated replication data from original stub files that have been replicated from the source system, embodiments of the invention can advantageously utilize priority tags or like identifiers. Thus, when accessing a stub file on the destination system, such as to modify the replication data or to perform a system restore process, the tagged stub files can be used to recall the archived data prior to performing the requested operation so that an accurate replica of the source data is generated.

Embodiments of the invention can also be used to restore data from one or more snapshots that represent replicated data in a "known good," "stable" or "recoverable" state, even when the snapshots comprise one or more stub files. Certain tags or other priority identifiers can be used to distinguish the stub files that represent migrated replication data from those stub files that had been replicated from a source machine.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods and functions described herein are not limited to any particular sequence, and the blocks or states relating thereto can be performed in other sequences that are appropriate. For example, described blocks or states may be performed in an order other than that specifically disclosed, or multiple blocks or states may be combined into a single block or state.

FIG. 1 illustrates a block diagram of a data management or replication system 100 according to certain embodiments of the invention. In general, the data replication system 100 can engage in continuous data replication between source and destination device(s), such that the replicated data is substantially synchronized with data on the source device(s). Moreover, the data replication system 100 advantageously provides for further migration of the destination data, such as based on de-duplication or other storage policies, to conserve available disk space of the destination system. In doing so, the data replication system 100 is advantageously configured to identify replication data that has been migrated and to account for the migrated data when engaging in additional data management operations, such as when modifying and/or restoring replication data.

As shown in FIG. 1, the data replication system 100 comprises a source system 102 capable of communicating with a destination system 104 by sending and/or receiving data over a network 106. For instance, in certain embodiments, the destination system 104 receives and/or stores a replicated copy of at least a portion of data, such as application-specific data, associated with the source system 102, such as on a source storage device 112.

The illustrated network 106 advantageously comprises any means for communicating data between two or more systems or components. It certain embodiments, the network 106 comprises a computer network. For example, the network 106 may comprise a public network such as the Internet, a virtual private network (VPN), a token ring or TCP/IP based network, a wide area network (WAN), a local area network (LAN), an intranet network, a point-to-point link, a wireless network, a cellular network, a wireless data transmission system, a two-way cable system, an interactive kiosk network, a satellite network, a broadband network, a baseband network, combinations of the same or the like. In embodiments wherein the source system 102 and destination system 104 are part of the same computing device, the network 106 may represent a communications socket or other suitable internal data transfer path or mechanism.

In certain embodiments, the source system 102 can comprise any computing device or means for processing data and includes, for example, a server computer, a workstation, a personal computer, a cell phone, a portable computing device, a handheld computing device, a personal digital assistant (PDA) or the like.

As shown, the source system 102 comprises one or more applications 108 residing on and/or being executed by a computing device. For instance, the applications 108 may comprise software applications that interact with a user to process data and may include, for example, database applications (e.g., SQL applications), word processors, spreadsheets, financial applications, management applications, e-commerce applications, browsers, combinations of the same or the like. For example, in certain embodiments, the applications 108 may comprise one or more of the following: MICROSOFT EXCHANGE, MICROSOFT SHAREPOINT, MICROSOFT SQL SERVER, ORACLE, MICROSOFT WORD and LOTUS NOTES.

The source system 102 further comprises one or more processes, such as filter drivers 110, that interact with data (e.g., production data) associated with the applications 108 to capture information usable to replicate application data to the destination system 104. For instance, the filter driver 110 may comprise a file system filter driver, an operating system driver, a filtering program, a data trapping program, an application, a module of the application 108, an application programming interface ("API"), or other like software module or process that, among other things, monitors and/or intercepts particular application requests targeted at a file system, another file system filter driver, a network attached storage ("NAS"), a storage area network ("SAN"), mass storage and/or other memory or raw data. In some embodiments, the filter driver 110 may reside in the I/O stack of the application 108 and may intercept, analyze and/or copy certain data traveling from the application 108 to a file system.

In certain embodiments, the filter driver 110 may intercept data modification operations that include changes, updates and new information (e.g., data writes) with respect to application(s) 108 of interest. For example, the filter driver 110 may locate, monitor and/or process one or more of the following with respect to a particular application 108, application type or group of applications: data management operations (e.g., data write operations, file attribute modifications), logs or journals (e.g., NTFS change journal), configuration files, file settings, control files, other files used by the application 108, combinations of the same or the like. In certain embodiments, such data may also be gathered from files across multiple storage systems within the source system 102. Furthermore, the filter driver 110 may be configured to monitor changes to particular files, such as files identified as being associated with data of the application(s) 108.

In certain embodiments, multiple filter drivers 110 may be deployed on a computing system, each filter driver being dedicated to data of a particular application 108. In such embodiments, not all information associated with the client system 102 may be captured by the filter drivers 110 and, thus, the impact on system performance may be reduced. In other embodiments, the filter driver 110 may be suitable for use with multiple application types and/or may be adaptable or configurable for use with multiple applications 108. For example, one or more instances of customized or particular filtering programs may be instantiated based on application specifics or other needs or preferences.

The illustrated source system 102 further comprises the source storage device 112 for storing production data of the application(s) 108. The source storage 112 may include any type of physical media capable of storing electronic data. For example, the source storage 112 may comprise magnetic storage, such as a disk or a tape drive, or other type of mass storage. In certain embodiments, the source storage 112 may be internal and/or external to (e.g., remote to) the computing device(s) having the applications 108 and the filter drivers 110. In yet other embodiments, the source storage 112 can include a NAS or the like.

In yet other embodiments, the source storage 112 can comprise one or more databases and database logs. For instance, in certain embodiments, database transactions directed to the source storage 112 may be first written to a file in the database logs and subsequently committed to the database in accordance with data management techniques for enhancing storage operation performance.

As further illustrated in FIG. 1, the destination system 104 comprises a replication module 114 and a destination storage device 116. In certain embodiments, the replication module 114 is configured to monitor and/or manage the copying of data from the source system 102 to the destination system 104, such as data associated with the information obtained by the filter drivers 110. For example, the replication module 114 can comprise any computing device capable of processing data and includes, for example, a server computer, a workstation, a personal computer or the like. In yet other embodiments, the replication module 114 is a "dumb" server or terminal that receives and executes instructions from the source system 102.

The destination storage 116 may include any type of physical media capable of storing electronic data, such as replication data sent from the source system 102. For example, the destination storage 116 may comprise magnetic storage or other type(s) of mass storage. In certain embodiments, the destination storage 116 may be internal and/or external to the computing device(s) having the replication module 114.

In certain embodiments, the source storage 112 and/or the destination storage 116 may be implemented as one or more storage "volumes" that include physical storage disks defining an overall logical arrangement of storage space. For instance, disks within a particular volume may be organized as one or more groups of redundant array of independent (or inexpensive) disks (RAID). In certain embodiments, either or both of the storage devices 112, 116 may include multiple storage devices of the same or different media.

As shown, the data replication system 100 further includes a data migration module 118 in communication with the destination storage 116. In general, the migration module 118 is configured to copy, or migrate, data from the destination storage 116 to a secondary storage 120. For example, the migration module 118 can selectively archive, back up or otherwise copy certain portions of the replication data on the destination storage 116 to the secondary storage 120. In certain embodiments, the migration module 118 is further configured to truncate data on the destination storage 116.

In certain embodiments, the migration module 118 is configured to perform file or block-level single instancing, or de-duplication, of the data stored on the destination storage 116. Examples of single instancing methods and structures usable with embodiments of the invention are discussed in U.S. patent application Ser. No. 12/145,342, filed Jun. 24, 2008, published as U.S. Patent Application Publication No. 2009-0319585 A1, which is hereby incorporated herein by reference in its entirety to be considered part of this specification. In yet other embodiments, the migration module 118 is configured to perform one or more of the following copy operations: archiving, backup, Hierarchical Storage Management ("HSM") copies, Information Lifecycle Management ("ILM") copies or the like.

In certain embodiments, the migration module 118 can advantageously replace the copied data on the destination storage 116 with a stub file or like object that indicates the new location of the migrated data on the secondary storage 120. For instance, the stub file can comprise a relatively small, truncated file (e.g., several kilobytes) having the same name as the original file. The stub file can also include metadata that identifies the file as a stub and that can be used by the storage system to locate and restore the migrated data to the destination storage 116 or other location.

The secondary storage 120 can include any type of physical media capable of storing electronic data, such as the migrated data from the destination storage 116. In certain embodiments, secondary storage 120 comprises media configured for long-term data retention, such as tape media or the like. In yet other embodiments, the secondary storage 120 can comprise a disk or other type of mass storage. For example, in certain embodiments, the secondary storage 120 advantageously comprises a slower access time and/or a less expensive storage medium than the destination storage 116.

Moreover, although the migration module 118 and the secondary storage 120 are illustrated as being external to the destination system 104, it will be understood that either or both of these components can be integrated into the destination system 104. For instance, in certain embodiments the replication module 114 can include the migration module 118, and/or the destination storage 116 can include the secondary storage 120.

Figure 2:
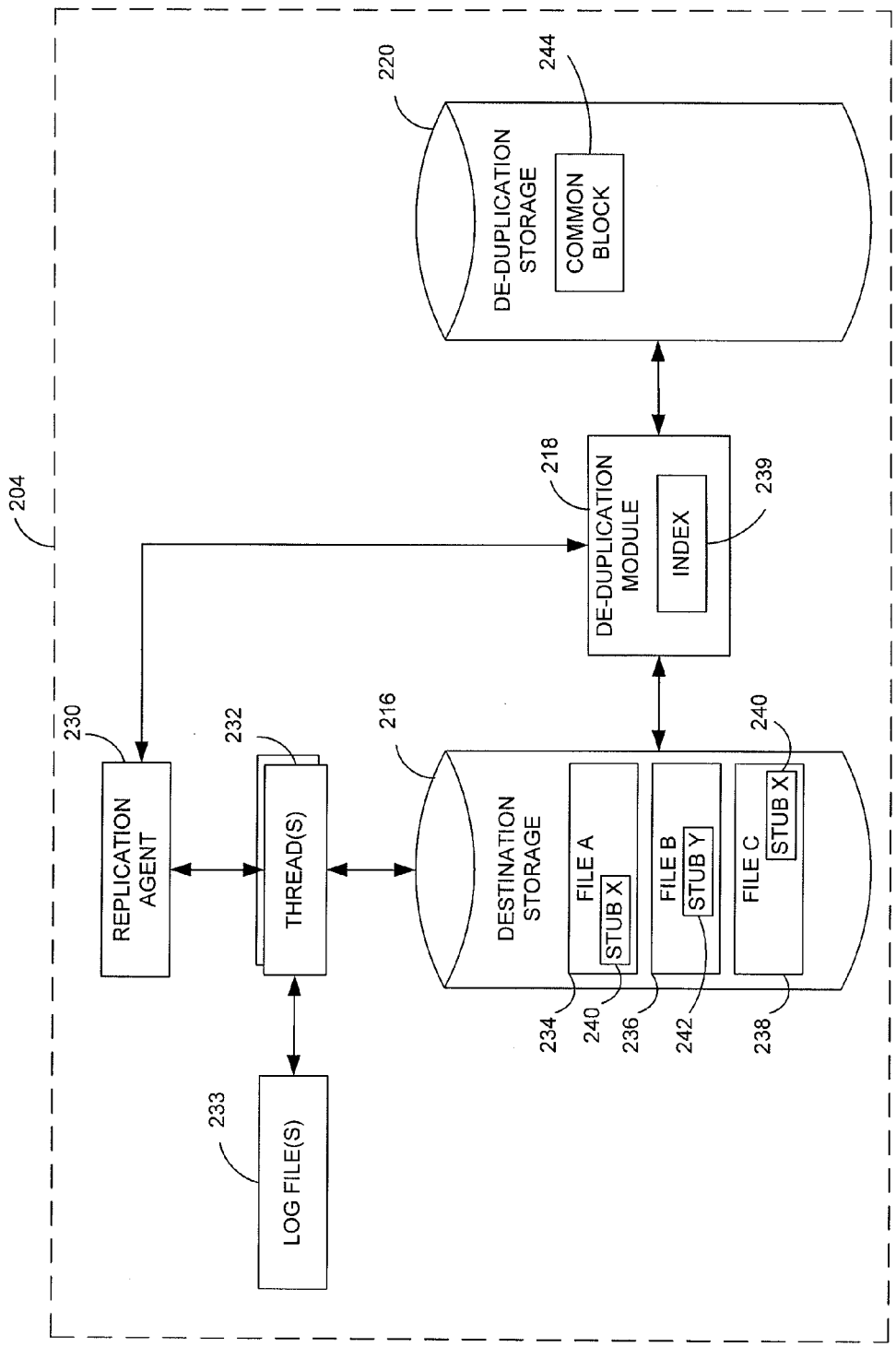
FIG. 2 illustrates a block diagram of an exemplary embodiment of a destination system of the data replication system of FIG. 1.

FIG. 2 illustrates a block diagram of an exemplary embodiment of a destination system 204 that provides for de-duplication of data in a CDR system. For instance, the destination system 204 can be advantageously configured to maintain a replication copy of data from a source system while conserving space used on the destination storage device.

In certain embodiments, the destination system 204 can be used in the data replication system 100 of FIG. 1. Thus, to simplify the description, certain components of the destination system 204 of FIG. 2 will not be redescribed in detail if they were described above. Rather, the components of the destination system 204 will be given a reference numeral that retains the same last two digits as the reference numeral used in data replication system 100 of FIG. 1, and the last two digits will be preceded with a numeral "2."

As shown in FIG. 2, the destination system 204 comprises a replication agent 230 and one or more processes, such as threads 232, that populate a destination storage 216. In certain embodiments, the replication agent 230 comprises one or more software modules that coordinate the transfer of data from a source system, such as the source system 102 to the destination storage 216. For instance, the replication agent 230 can manage replication based on one or more predefined preferences, storage policies or the like.

In certain embodiments, the replication agent 230 instantiates an appropriate number of threads, processes, or routines, 232 for copying data from replication log files 233 to the destination storage 216 to maintain a replicated copy of a source storage device. In operation, in certain embodiments, the threads 232 advantageously process or traverse the entries of the replication logs 233 for particular types of data and then copy that data to certain locations on one or more replication volumes based on data paths identified by the replication agent 230 and/or associated with each thread 232.

For example, in certain embodiments, the replication logs 233 can contain a copy of the data stored on source logs of a client system and/or particular data operations being performed on the source system data. Such replication logs 233 can comprise any type of memory capable of storing data including, for example, cache memory. In certain embodiments, the replication logs 233 may reside on the destination system 204, such as, for example, on the destination storage 216, or at least a portion of the replication logs 233 may be external to the destination system 204. In certain embodiments, once the replication logs 233 have been populated with the data from the source logs, the data on the source logs is available to be erased and/or overwritten to conserve memory space.

In certain embodiments, one thread 232 may write to one or more volumes of the destination storage 216 and/or multiple threads 232 may write to a single volume in parallel. Moreover, each thread 232 can be assigned to a hard-coded path pair, which includes (i) a source path identifying the location on the source storage device associated with a data management operation (e.g., "C:\Folder\") and (ii) a destination path identifying the location on the destination storage 216 to receive the replicated data (e.g., "D:\folder\") from the thread 232.

The destination system 204 further includes a de-duplication module 218 that traverses the data in the destination storage 216 to identify common data objects within one or more files on the destination storage 216. For instance, in certain embodiments, the de-duplication module 218 performs block-level de-duplication to identify common 64 KB blocks of data on the destination storage 216.

In certain embodiments, the de-duplication module 218 generates a substantially unique identifier for each 64 KB block, such as by performing a cryptographic hash function (e.g., message-digest algorithm 5 (MD5)), a secure hash algorithm (e.g., SHA-256), a (digital) digital fingerprint, a checksum, combinations of the same or the like. For each block having a matching identifier, the de-duplication module 218 can assume that such blocks contain identical data. For instance, the de-duplication module 218 can generate the substantially unique identifier for each block on-the-fly while traversing the blocks of the destination storage 216.

In yet other embodiments, the identifier for each block can be calculated by a module other than the de-duplication module 218, such as by a media agent, the replication agent 230 or the like. For instance, the identifier can be generated, in certain embodiments, when the block is initially stored on the destination storage 216, as part of the replication process from the source system 102 to the destination system 104, or at any other time prior to the comparison by the de-duplication module 218.

To conserve storage space, each set of common or identical blocks of data found in the destination storage 216 can be stored as a single block in the de-duplication storage 220. Moreover, the de-duplication module 218 can replace each of the common blocks on the destination storage 216 with a substantially smaller stub file that indicates that the actual data block has been copied to the de-duplication storage 220.

For instance, as shown in FIG. 2, the destination storage 216 comprises three files, File A 234, File B 236 and File C 238. Two of the files, File A 234 and File C 238, have a common data block, which has been replaced with a de-duplication stub file (i.e., Stub X 240) by the de-duplication module 218. This common data block is stored in the de-duplication storage 232 as common block 244.

In certain embodiments, the de-duplication stub file 240 is distinguishable from other stub files via a tag, a header entry or other like identifier. Such identification can be advantageous in a replication system, such as the destination system 204, so that the system can distinguish between stubs that have been replicated to the destination storage 216 from a source storage device and stubs that represent actual data on the destination storage 216 that has been archived, de-duplicated or otherwise migrated from the destination storage 216 to de-duplication storage 220.

For example, File B 242 on the destination storage 216 also includes a stub file (i.e., Stub Y 242) that has been replicated from a source storage device. Thus, in certain embodiments, Stub Y 242, a non de-duplication stub file, does not necessarily correspond to a common block stored on the de-duplication storage 220 and does not include the same tag or other identifier contained by the de-duplication stub files.

In certain embodiments, the de-duplication module 218 further maintains a tag index 239 that tracks tag values used by stubs on the destination storage 216. For instance, the index 239 can indicate which tag value(s) are assigned to de-duplication stub files (e.g., Stub X 240) and/or replicated stub files (e.g., Stub Y 242). Thus, in such embodiments, the de-duplication module 218 can access the index 239 any time it encounters a stub file on the destination storage 216 based on the tag value contained by the stub. In yet other embodiments, the index 239 can be maintained on the destination storage 216, the de-duplication storage 220 or other component of the destination system 204.

Although not illustrated in FIG. 2, the destination system 204 can further comprise a de-duplication database that associates de-duplication stub files 240 on the destination storage 216 with their corresponding common block(s) 244 on the de-duplication storage 220. For example, the de-duplication module 218 can be configured to maintain and/or access a table, index, linked list or other structure that stores entries for each of the de-duplication stub files 240 on the destination storage 216 and the location of the corresponding common block 244 on the de-duplication storage 220.

Although the stub files illustrated in FIG. 2 have been described with reference to common data blocks, in other embodiments of the invention the stub files can be used to identify other identical data objects, such as files, strings or the like. Moreover, the common data objects need not be limited to 64 KB but may be larger or smaller depending on the specifications (e.g., operating system) of the applicable system.

The de-duplication module 218 can further be configured to restore and/or recall data from the de-duplication storage 220. For instance, as discussed in more detail below, the de-duplication module 218 can advantageously retrieve the de-duplication or archived data in response to a request to access the replication data on the destination storage 216.

Furthermore, although the destination system 204 of FIG. 2 has been described with reference to de-duplication of data, it will be understood from the disclosure herein that other embodiments of the destination system 204 can be configured to perform other migration processes, as disclosed above, that result in the copying and/or stubbing of data.

As is further illustrated, in certain embodiments the replication agent 230 can communicate directly with the de-duplication module 218. For instance, the two components can schedule access to replication data on the destination storage 216, and/or the replication agent 230 can instruct the de-duplication module to restore data, such as the common block 244, from the de-duplication storage 220 to the destination storage 216.

Figure 3:
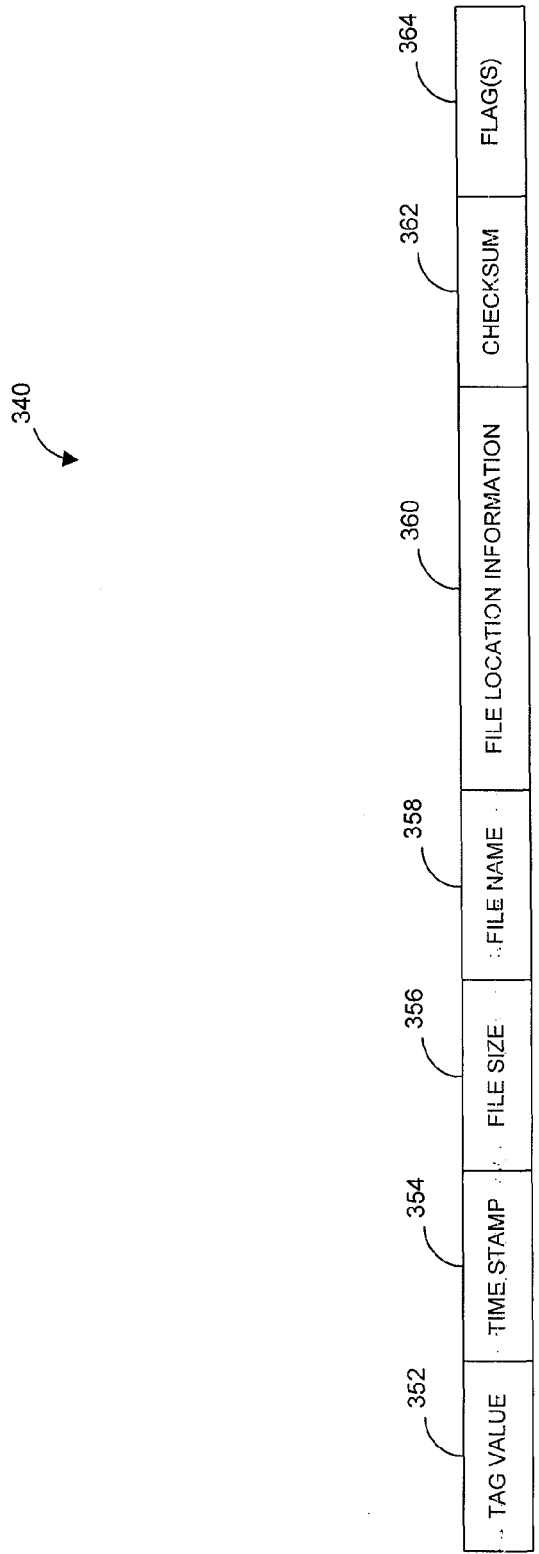
FIG. 3 illustrates an exemplary de-duplication stub file usable with the destination system of FIG. 2.

FIG. 3 illustrates an exemplary de-duplication stub file 340 usable with the destination system 204 of FIG. 2. In general, the de-duplication stub file 340 contains information that is necessary to locate and/or recall a migrated file or data object. In certain embodiments, the de-duplication stub file 340 comprises a self-describing stub that distinguishes the stub 340 from other types of stubs, such as those that have been replicated from a source system in a replication system.

For instance, in certain embodiments, the de-duplication stub file 340 comprises a 4 KB file that represents a common 64 KB block of data. In certain embodiments, the de-duplication module 218 or other like module utilizes the data within the stub 340 to retrieve the 64 KB data block in response to a data modification or restore operation request for the replication data. For example, the de-duplication stub file 340 can reference a block offset of the corresponding 64 KB data block 244 within the de-duplication storage 220. In yet other embodiments, the stub file 340 can represent an entire file or data object rather than a fixed block size.

For exemplary purposes, the de-duplication stub file 340 is shown in FIG. 3 with a plurality of fields. It will be understood that the illustrated stub file 340 is merely exemplary and that one or more of such fields can be optional and/or dependent on the type of operating system(s) used in the replication system.

As shown, the stub file 340 includes a tag value field 352. In certain embodiments, the tag value 352 distinguishes the de-duplication stub file 340 from regular stub files. For instance, in certain embodiments, the tag value 352 can be one of two preset values: a first value that identifies the stub file as a de-duplication stub file or a second value associated with a replicated stub file that represents a file migrated from a source storage device (e.g., a stub file that was itself replicated in a copy operation). For example, the tag value 352 could comprise a single bit to distinguish the two types of stub files.

In yet other embodiments, the tag value 352 can comprise a unique, substantially unique or other identifier (e.g., an alphanumeric value) that can be used in accessing a lookup table or like structure (e.g., index 239) to determine if the stub file 340 is a de-duplication stub file or a regular stub file.

A time stamp field 354 can store an indication of when the represented file was migrated to secondary storage and replaced with the stub file. The file size field 356 can indicate the size of the file and/or block represented by the stub file 340. In environments wherein all stub files reference a predetermined block size, the stub file 340 may not have such a field.

A file name field 358 indicates the name of the file referenced by the stub file 340. In certain embodiments, the stub file 340 itself is assigned the same name as the migrated file, thereby presenting the appearance that the actual file is located in the particular storage location.

The stub file 340 further includes a file location information field 360 containing data for locating and/or retrieving the migrated file. For example, the field 360 can comprise an archive file identifier, volume identifier, one or more offset values, a pathname, an address, combinations of the same or the like. It will be understood from the disclosure herein that the field 360 is illustrated as one field for simplification purposes and that other embodiments of the stub file 340 can comprise multiple fields (adjacent or non-adjacent) with information relating to the location of the migrated file. In general, the field 360 comprises enough information such that a migration module (e.g., migration module 118) can access the migrated file.

A checksum field 362 includes data for verifying that a restored file is not corrupted and/or accurately represents the data object that was migrated. For instance, when restoring a migrated file or object, the value in the checksum field 362 of the corresponding stub file 340 can be compared with a checksum of the restored file to validate the data.

The stub file 340 further includes a flag field 364 that contains other information regarding the migrated file or data object. For example, the flag field 364 can indicate whether or not the migrated file is encrypted, compressed or the like. In yet other embodiments, the stub file 340 can function without the flag field 364.

Although the de-duplication stub file 340 has been described with respect to particular embodiments, it will be understood from the disclosure herein that the stub file 340 can comprise more or fewer fields or information than what is illustrated in FIG. 3. Moreover, the stub file 340 may comprise a file between 511 bytes and 16 KB in size.

Figure 4:
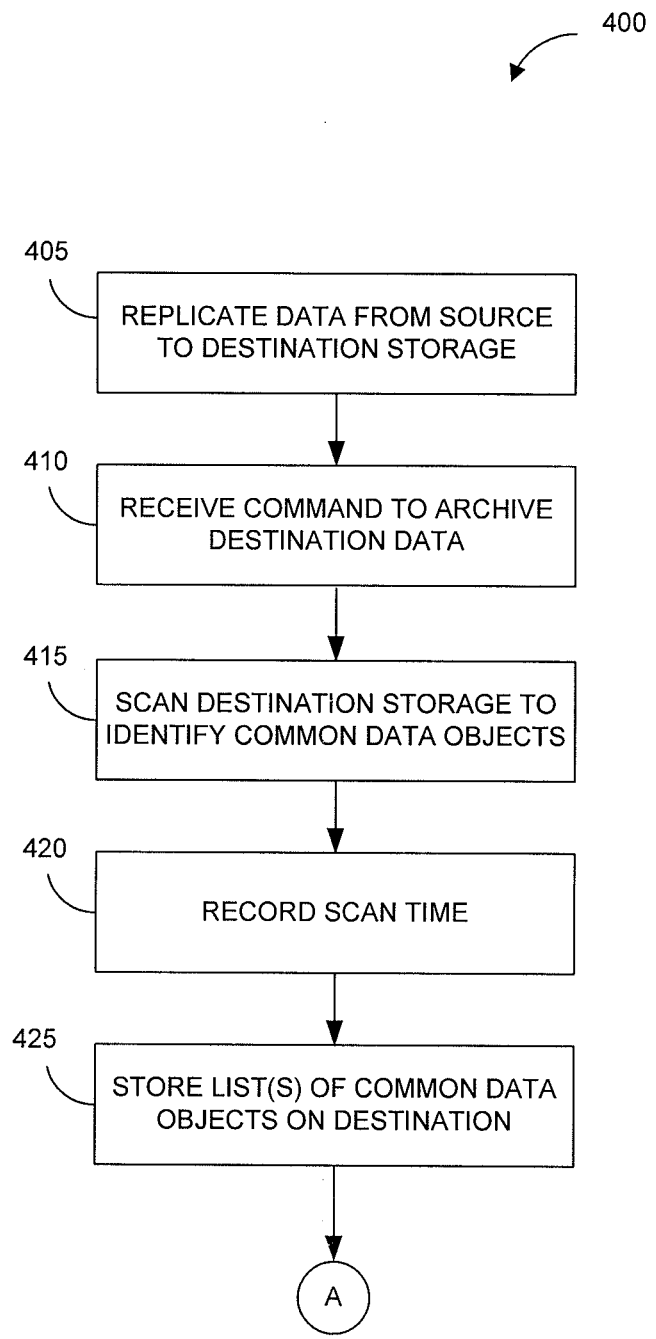
FIGS. 4-6 illustrate flowcharts of an exemplary embodiment of a de-duplication method for destination data of a CDR system, such as the data management system of FIG. 1. In particular.
Figure 5:
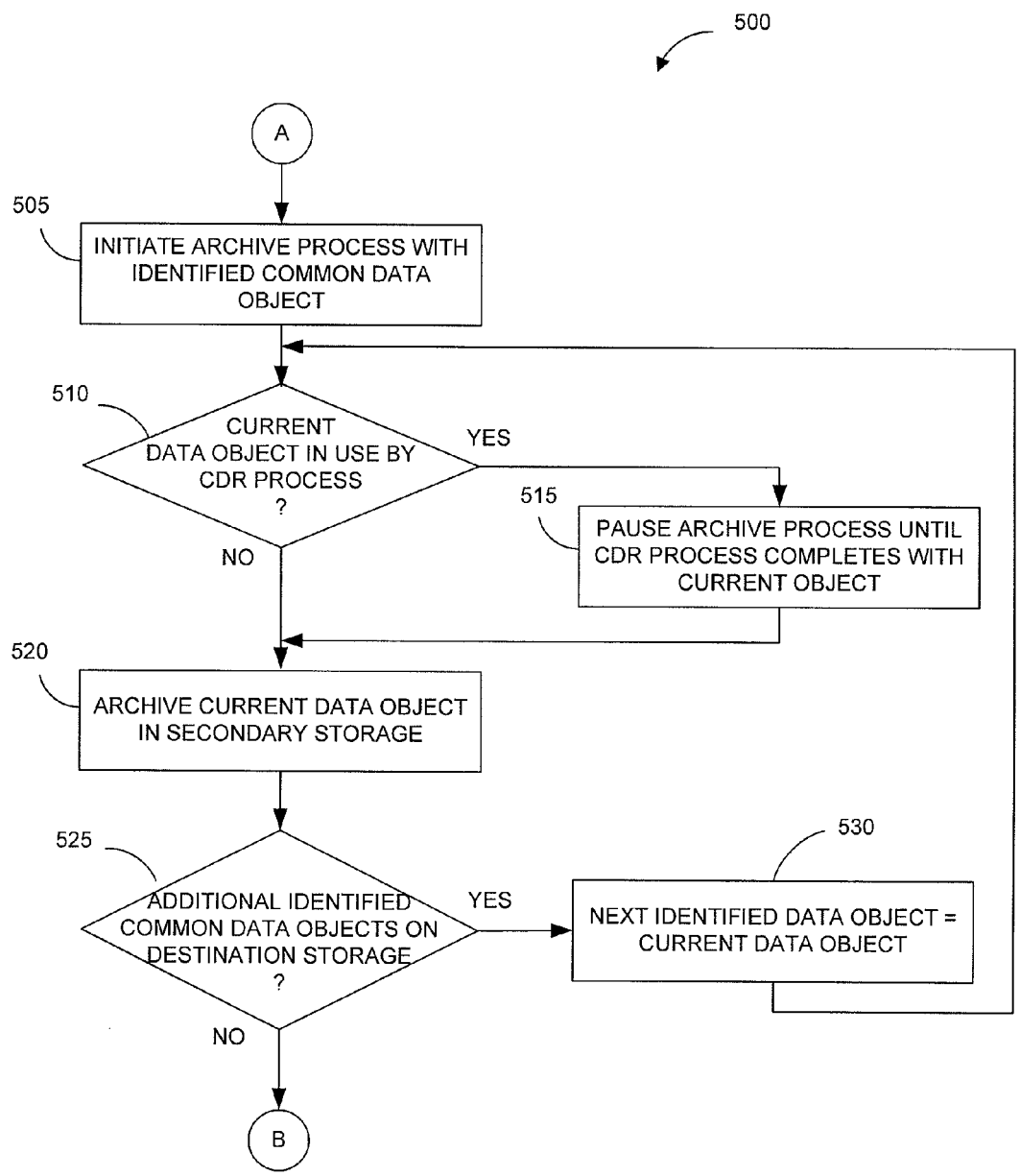
Figure 6:
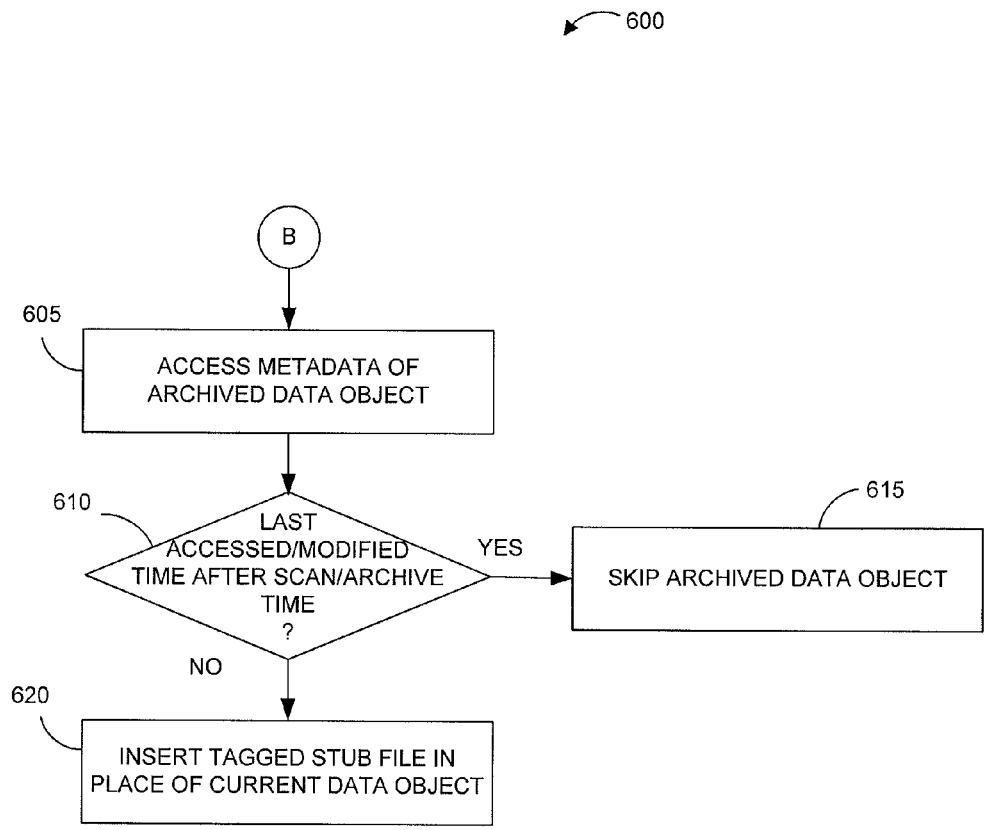

FIGS. 4-6 illustrate three flowcharts of an exemplary embodiment of a method for de-duplicating, or single instancing, replicated data in a data replication system, such as a CDR system. In general, the illustrated de-duplication method provides for the migrating and stubbing of common data objects on a destination storage device without significantly impacting the performance of data replication to the destination storage device. For exemplary purposes, the blocks of the flowcharts of FIG. 4-6 will be described with reference to the components of the destination system 204 of FIG. 2.

With respect to FIG. 4, a flowchart is shown of an exemplary embodiment of a scan process 400 of a de-duplication method for the destination system 204. In general, the scan process 400 involves identifying common data objects within replication data of a destination storage device.

At Block 405, the replication agent 230 and thread(s) 232 replicate data from a source storage device to the destination storage device 216. In certain embodiments, this block continues to be executed throughout the scan process 400 and/or other processes of FIGS. 5 and 6. In certain embodiments, the replication of data to the destination storage 216 is given priority over one or more other data operations of the de-duplication method described below in order to maintain substantial coherency between the replicated data and the source system data. Moreover, the de-duplication of the replicated data can be performed without significantly impacting the primary data replication process.

At Block 410, the de-duplication module 218 receives a command to archive data on the destination machine. In certain embodiments, the de-duplication module 218 initiates archiving based on a storage policy and/or user input. For instance, the storage policy can dictate that archiving be performed daily or on another periodic basis. In yet other embodiments, archiving can be performed based on an available storage capacity of the destination storage 216.

At Block 415, the de-duplication module 218 scans the destination storage 216 to identify common data objects. For instance, the de-duplication module 218 can identify 64 KB data blocks on the destination storage 216, such as from different files, that comprise identical data. In certain embodiments, the de-duplication module 218 can perform a cryptographic hash function or other algorithm, as discussed previously, to generate a substantially unique identifier based on the data contained in each block. For each block having the same identifier, the de-duplication module 218 can identify the block as a candidate for de-duplication together with the other like blocks, such as through a flag or other marker, listing the blocks in a data structure, or the like.

The term "data object" as used herein is a broad term and is used in its ordinary sense and includes, without limitation, any distinct or identifiable grouping of electronic information that exists in storage and/or on which operations can be performed. For example, a data object can comprise a data file, a data block, a program, an array, any other collection of electronic information or the like.

In certain embodiments, in order to avoid excessive restore operations on migrated data of secondary storage 220, it is preferred to not archive data that has a relatively high likelihood of being accessed in the future. Thus, during the scanning, the de-duplication module 218 can identify those common data objects on the destination storage 216 that have not been modified and/or accessed within a predetermined period of time (e.g., within the last seven days).

At Block 420, the process 400 records the scan time of the destination data. As discussed in more detail below with respect to FIG. 6, the scan time can advantageously be used to determine whether or not a particular data object should be stubbed. It will be understood that Block 420 can comprise recording of individual scan times for each data object on the destination storage 216 or the time that the scan process was initiated for the entire set of replication data.

At Block 425, the de-duplication module 218 maintains a list or other record of the common data objects that were identified on the destination storage as being candidates for de-duplication.

Although the scan process 400 has been described with respect to particular blocks, other embodiments of the process can include different and/or fewer blocks than those described above. For instance, in certain embodiments, the process 400 can conduct an initial scan of the destination storage 216 for all data objects that have not been modified and/or accessed for a predetermined period of time (e.g., more than seven days), which data objects are identified as candidates for archiving or migration to secondary storage. A second pass is then made by the de-duplication module 218 through these identified data objects to locate common data objects that can be de-duplicated to the de-duplication storage 220.

Following the scan process 400, the de-duplication module 218 commences with the archive process portion of the de-duplication method. FIG. 5 illustrates a flowchart of an exemplary embodiment of an archive process 500 of the de-duplication method for a replication system. In general, this archive process 500 involves determining appropriate times to migrate or copy replication data from the destination storage 216.

At Block 505, the de-duplication module 505 accesses a common data object identified in the list created in Block 425. Before archiving each data object, the de-duplication module 218 at Block 510 determines if the particular data object is currently in use by a CDR process (e.g., is being modified based on changes to source system data). If the data object is currently in use, the de-duplication module 515 pauses the archive process 500 until the CDR process has completed (Block 515). In yet other embodiments, the de-duplication module 218 can move to a next identified data object for archiving.

At Block 520, if the current data object is not in use by a CDR process, the de-duplication module 218 archives the current data object in secondary storage 220. In certain embodiments, Block 520 comprises storing only a single common block 244 in the de-duplication storage 220 for identical data blocks within the replication data set.

The archive process 500 then determines if there are additional data objects on the destination storage 216 that have been identified for archiving (Block 525). If there are additional data objects, the de-duplication module 218 moves to the next data object (Block 530), and the archive process 500 returns to Block 510. Otherwise, the archive process 500 completes, and the de-duplication method commences with stubbing.

Although the process 500 has been described with reference to "archiving," it should be understood that the process 500 can apply similarly to migrating, de-duplicating, single instancing or other types of copy operations. Rather, the term "archiving" is used with respect to process 500, and the remainder of the de-duplication process, for simplification purposes.

FIG. 6 illustrates a flowchart of an exemplary embodiment of a stubbing process 600 usable with the destination system 204. In general, the process 600 can be performed on each of the data objects archived by the process 500 to replace the objects with stub files or like truncation objects in order to conserve space on a destination storage device of a replication system.

In particular, in certain circumstances, the data of a replicated file can change on the destination storage 216 between the time of a scan of the destination storage (Block 415) and the time at which the data object is to be stubbed. Thus, the process 600 advantageously accounts for such data modifications by requiring the de-duplication module 218 to first access the metadata of each data object on the destination storage 216 that has been archived on secondary storage 220 to determine a Fast accessed and/or modified time for the data object (Block 605).

In certain further embodiments, such data objects can be tagged or otherwise identified or recorded during the scan process 400 and or archive process 500 such that the de-duplication module 218 can quickly locate the data objects during the process 600.

If the last accessed and/or modified time of the particular data object is after the recorded scan time (Block 610), the de-duplication module 218 does not proceed with replacing the data object with a stub file (Block 615). In such situations, it is possible that the data object archived on secondary storage 220 is no longer consistent with the data object on the destination storage 216.

In yet other embodiments, the process 600 determines at Block 610 if the last accessed and/or modified time is after a time that the data object was archived or copied instead of the scan time. If so, the process 600 continues with Block 615.

If the data object has not been accessed and/or modified since the scan time and/or archive time, the de-duplication module 218 replaces the archived data object with a stub file, such as the de-duplication stub file 340 illustrated in FIG. 3. As discussed above, the stub file can advantageously be a self-describing stub file that is used to identify archived and/or de-duplicated data and can differ in content and/or structure from other types of stub files. Moreover, in the de-duplication environment, multiple data objects on the destination storage 216 can be replaced with the same stub file or a stub file with the same tag, which references a common data block on the secondary storage 220. Once the stubbing process 600 has completed processing each of the identified data objects, the de-duplication method 600 is completed.

In yet other embodiments of the invention, systems and methods can immediately replace archived data objects with stub files on the destination storage 216 prior to continuing with scanning the entire storage device. In such embodiments, the likelihood of the data object being accessed and/or modified between the time of the scan and the time of stubbing is decreased substantially.

In certain embodiments of the data replication system 100, the source system 102 communicates with the associated destination system 104 to verify that the two systems are synchronized. For instance, the source system 102 may receive from the destination system 104 an identification (e.g., unique serial number) of the data operation currently being replicated by the destination system. The source system 102 may then compare the received identification with the data operation being forwarded to the source storage 112.

Figure 7:
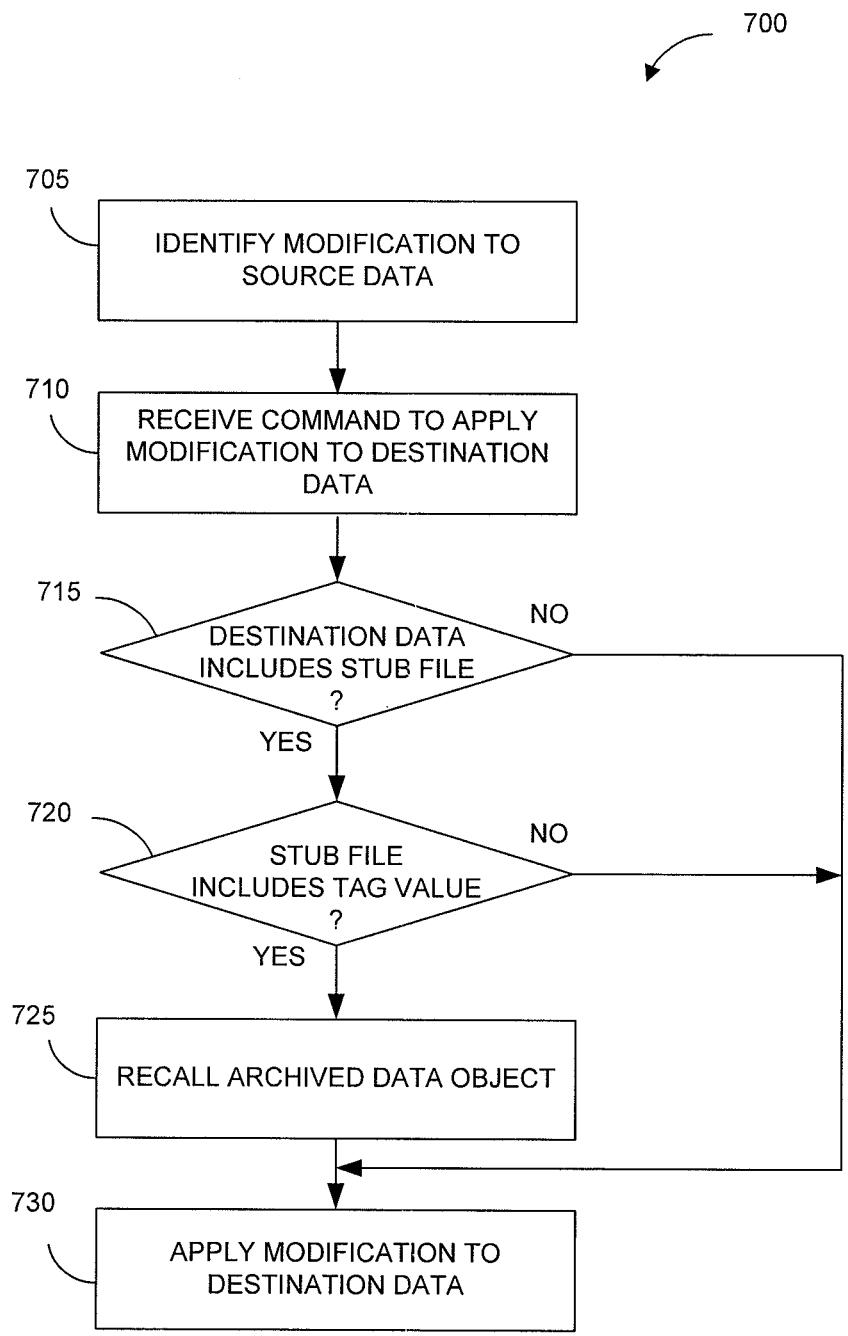
FIG. 7 illustrates a flowchart of an exemplary embodiment of a synchronization process usable by the data replication system of FIG. 1.

In order to ensure that the data modifications are being made to the same data on the destination system as the source system, certain embodiments of the invention are configured to account for the use of stub files in the replication data. FIG. 7 illustrates a flowchart of an exemplary embodiment of a synchronization process 700 usable in a data replication environment. In particular, the synchronization process 700 is capable of modifying files on a destination storage device of a replication system that have been stubbed according to a de-duplication policy, archive policy, migration policy or the like. For exemplary purposes, the synchronization process 700 will be described with reference to the components of the data replication system 100 of FIG. 1.

At Block 705, the synchronization process 700 identifies a modification to data on the source system 102. For instance, a log file indicative of data modifications of the source system 102 data can be sent over a network to the destination system 104 via a CDR process. Examples of CDR processes and configurations usable with embodiments of the invention are described in U.S. Pat. No. 7,651,593, issued Jan. 26, 2010, which is hereby incorporated herein by reference in its entirety.

In certain embodiments, the replication module 114 receives the command to modify the replication data on the destination storage 116 based on changes made to the source data (Block 710). Prior to doing so, the replication module 114 determines if the replication data to be modified includes a stub file (Block 715). For instance, the replication module 114 can read metadata of the replication data to determine if any of the data comprises a stub file. In yet other embodiments, the replication module 114 can access an index or cache that maintains a record of the stub files within the replication data. Such a cache or index may be maintained, for example, by the migration module 118.

If the replication data includes a stub file, the process 700 continues with Block 720 to determine if the stub file includes a tag or other predetermined value (e.g., via tag value 352). In certain embodiments, the tag value distinguishes the particular stub file as being associated with replication data that has been migrated, archived, de-duped or otherwise moved to secondary storage 120 by the migration module 118 as opposed to a stub file replicated from the source storage 112. For instance, the tag value can comprise an identifier that is compared with a list of identifiers in a migration table or index to determine if the stub file is a de-duplication stub file or a replicated stub file.

If the stub file does include the tag value, the process 700 recalls the actual data object(s) referenced by the stub file and restores the data to the destination storage 116. In certain embodiments, the replication module 114 can invoke the migration module 118 to recall the data. In certain further embodiments, the recall function can take priority over other jobs being performed or scheduled to be performed by the migration module 118 because the CDR process is halted until the pertinent replication data is recalled and restored to the destination storage 116 from secondary storage 120.

Once the data is restored from secondary storage 120, or if the replication data does not include (tagged) stub files, the process 700 moves to Block 730 to apply the requested modification to the replication data, after which the process 700 terminates for the particular requested modification.

Figure 8:
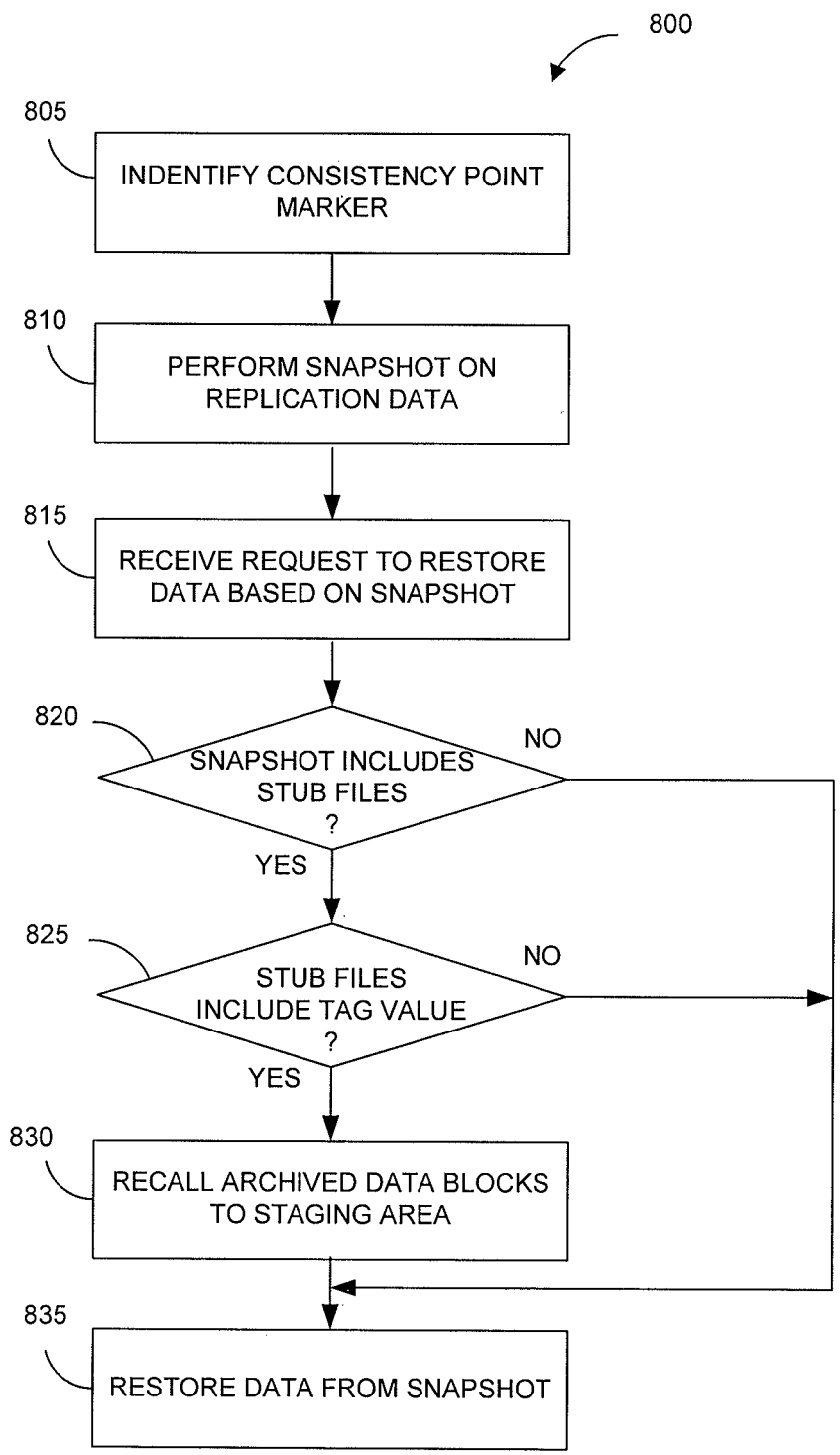
FIG. 8 illustrates a flowchart of an exemplary embodiment of a restore process usable by the data replication system of FIG. 1.

The tagged stub files can advantageously be used in a variety of other processes. FIG. 8 illustrates a flowchart of an exemplary embodiment of a process 800 for restoring data from one or more snapshots in a CDR system. In general, the restore process 800 is capable of restoring data from a snapshot including one or more stub files representing replication data that has been de-duplicated, archived, migrated or the like. For exemplary purposes, the restore process 800 will be described with reference to the components of the data replication system 100 of FIG. 1.

At Block 805, the replication module 114 identifies a point in time when the data of destination storage device 116 represents a "known good," "stable" or "recoverable" state. In certain embodiments, such a state may be defined as when particular computing operations of the application(s) 108 are complete to a point such that further operation, recovery and/or rolling back of the application(s) 108 may occur, based on the recorded or replicated data, without the loss of critical information or computing operations needed for operation of the application(s) 108. This point of referential integrity is generally referred to herein as a "known good" state of the application data.

In certain embodiments of the invention, a consistency point marker (e.g., logical marker or tag) in one or more CDR log files can identify when replication data represents a known good state. For instance, such a marker can be generated and/or inserted in the log files by the filter driver 110 and/or a data agent denoting that a "consistency point" or "consistency recovery point" has been reached. In some embodiments, the consistency point marker further indicates the time at which the application 108 was in the known good state. Additional details on such consistency point markers are disclosed in U.S. Pat. No. 7,651,593, issued Jan. 26, 2010, which is hereby incorporated herein by reference in its entirety.

In certain embodiments, the consistency point marker is replicated to the destination system 104 along with replicated data. As the replication marker 114 comes across the consistency point marker, it knows that the replication data, at that point in time, represents a known good state. Based on the consistency point marker, the replication module 114 can advantageously perform a snapshot on the replication data (Block 810). As a result, the snapshot represents a point-in-time copy of the replication data in a known good state.

At Block 815, the process 800 later receives a request to restore the data that was the subject of the snapshot. For instance, the data restore request may be in response to a system crash or failure, and can involve restoring the storage device or volume to a previous or most recent known good state. In certain embodiments, the restore request comprises the replication module 114 or other component mounting the snapshot to obtain a full logical file system of the replication data at the time the snapshot was taken.

The replication module 114 then identifies whether or not the snapshot comprises any stub files (Block 820). If the snapshot comprises stub files, the process 800 determines if any of the stub files includes a particular tag or like identifier (Block 825). For instance, the replication module 114 can determine if a tag value of the stub file matches one or more predetermined values that identify stub files as representing migrated, archived or de-duplicated data as opposed to a stub file that was replicated from the source system 102.

If the stub file has such a tag or identifier, the process 800 recalls the actual data represented by the stub file to a staging area that serves as a temporary repository for the recalled data while the restore process 800 is being performed (Block 830). For instance, the replication module 114 and/or migration module 118 can recall archived data blocks to an area on the destination storage 116 or the secondary storage 120. For example, this staging area can be a temporary folder created to receive the recalled data for a brief duration until it is restored, after which the temporary folder can be deleted.

After the archived data has been recalled, or if the snapshot does not include any (tagged) stub files, the replication module 114 restores the data from the snapshot (Block 835). While performing the restore, when the replication module 114 comes across a stub file referenced by the snapshot, the replication module 114 can restore the appropriate data from the staging area rather than restore the stub file.

Although the process 800 has been described with reference to particular arrangements, other embodiments of the process 800 can have more or fewer blocks than those described above. For instance, the process 800 can be performed on snapshots that do not represent the replication data in a known good or recoverable state.

In certain embodiments of the invention, data replication systems and methods may be used in a modular storage management system, embodiments of which are described in more detail in U.S. Pat. No. 7,035,880, issued Apr. 5, 2006, which is hereby incorporated herein by reference in its entirety. For example, the data replication system may be part of a storage operation cell that includes combinations of hardware and software components directed to performing storage operations on electronic data. Exemplary storage operation cells usable with embodiments of the invention include CommCells as embodied in the QNet storage management system and the QINETIX or SIMPANA storage management systems offered by CommVault Systems, Inc. (Oceanport, N.J.), and as further described in U.S. Pat. No. 7,454,569, issued Nov. 18, 2008, which is hereby incorporated herein by reference in its entirety.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Embodiments of the invention are also described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flowchart and/or block diagram block or blocks.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for performing data management operations on replicated data of a destination storage device, the method comprising:
    processing, with at least one processor implementing one or more routines, at least one log file having a plurality of log entries indicative of operations generated by a computer application executing on a source system, the operations being directed to data on a source storage device; and
    replaying, with the at least one processor implementing the one or more routines, the operations on a destination storage device to modify replication data on the destination storage device, wherein said replaying further comprises,
        identifying a plurality of stub files within the replication data on a destination storage device, wherein the plurality of stub files comprises:
            one or more first stub files each comprising a predetermined tag value indicating that the corresponding first stub file represents and provides access to one or more non-stub file data objects that were copied to secondary storage following replication of the respective one or more non-stub file data objects from the source storage device to the destination storage device, wherein the first stub files were not replicated from the source storage device to the destination storage device and were instead created to provide access to the respective non-stub file data objects copied to secondary storage; and
            one or more second stub files replicated from the source storage device to the destination storage device, that do not comprise the predetermined tag value, that already existed as stub files when they were replicated from the source storage device to the destination storage device as stub files, and which do not provide access to the non-stub file data objects that were copied to secondary storage,
        wherein the one or more first stub files and the one or more second stub files reside on the destination storage device;
        for each of the one or more first stub files,
            based on the presence of the corresponding predetermined tag value, identifying each of the one or more first stub files as being one of the first stub files and not being one of the second stub files; and
            recalling from the secondary storage one or more data objects represented by each of the identified one or more first stub files and replacing each of the one or more first stub files with the corresponding data object prior to modifying the replication data, and
        modifying the replication data on the destination storage device to match the data on the source storage device.

2. The method of claim 1, wherein the one or more first stub files represent one or more data objects that were migrated to the secondary storage based on one or more storage policies.

3. The method of claim 1, wherein multiple ones of the one or more first stub files correspond to a single de-duplication data object stored in the secondary storage.

4. The method of claim 3, additionally comprising storing multiple de-duplication data objects to the secondary storage, wherein each of the de-duplication data objects comprises a data block of the same size.

5. The method of claim 1, additionally comprising creating the one or more first stub files with a migration module.

6. The method of claim 5, wherein said recalling further comprises obtaining with the migration module the one or more data objects from the secondary storage.

7. The method of claim 1, wherein the operations comprise data modification operations and file attribute modification operations.

8. The method of claim 1, wherein said identifying comprises comparing a tag value of each of the plurality of stub files with values in an index to identify the one or more first stub files comprising the predetermined tag value.

9. A destination system for performing data replication in a computer network, the destination system comprising:
    a destination storage device storing replication data having a plurality of stub files, the plurality of stub files comprising:
        one or more first stub files each comprising at least one predetermined tag value indicating that the corresponding first stub file represents and provides access to one or more data objects that were copied to secondary storage following replication of the respective one or more data objects from a source storage device to the destination storage device, wherein the first stub files were not replicated from the source storage device to the destination storage device and were instead created to provide access to the respective non-stub file data objects copied to secondary storage; and
        one or more second stub files replicated from the source storage device to the destination storage device, that do not comprise the at least one predetermined tag value, that already existed as stub files when they were replicated from the source storage device to the destination storage device as stub files, and which do not provide access to the non-stub file data objects that were copied to secondary storage,
    wherein the one or more first stub files and the one or more second stub files reside on the destination storage device;

at least one replication log file comprising a plurality of log entries indicative of data operations generated by a computer application for execution on the source storage device;

a replication module executing in one or more computer processors and configured to traverse the plurality of log entries in the at least one replication log file and to copy the log entries to execute the data operations on replication data of the destination storage device; and a migration module executing in one or more computer processors and configured to restore copied data from a secondary storage device to the destination storage device based on the one or more first stub files, and wherein the replication module is further configured to identify the one or more first stub files based on the one or more first stub files comprising the pre-determined tag value and instruct the migration module to replace the one or more first stub files with the copied data from the secondary storage device prior to executing the data operations on the replication data.

10. The destination system of claim 9, wherein the migration module is further configured to de-duplicate the replication data to the secondary storage device.

11. The destination system of claim 9, wherein the at least one predetermined tag value is stored in an index.

12. The destination system of claim 9, wherein the replication data comprises application-specific data.

13. The destination system of claim 9, wherein the copied data on the secondary storage device comprises a sixty-four kilobyte data block for each of the first stub files.

14. The destination system of claim 13, wherein each of the first stub files comprises a four kilobyte file.

15. The destination system of claim 13, where at least two of the first stub files correspond to the same data block on the secondary storage device.

16. The destination system of claim 9, wherein the second stub files represent at least stub files replicated from the source storage device.

17. The destination system of claim 9, wherein the destination storage device comprises a faster access time than the secondary storage device.

18. A non-transitory computer readable medium having stored thereon a computer program that embodies a method for performing data replication in a computer network, wherein the computer program is configured for storage on a computing system and comprises instructions for:

storing replication data having a plurality of stub files on a destination storage device, the plurality of stub files comprising:

one or more first stub files each comprising at least one predetermined tag value indicating that the corresponding first stub file represents and provides access to one or more data objects that were copied to secondary storage following replication of the respective one or more data objects from the source storage device to the destination storage device, wherein the first stub files were not replicated from the source storage device to the destination storage device and were instead created to provide access to the respective non-stub file data objects copied to secondary storage; and one or more second stub files replicated from the source storage device to the destination storage device, that do not comprise the at least one predetermined tag value, that already existed as stub files when they were replicated from the source storage device to the destination storage device as stub files, and which do not provide access to the non-stub file data objects that were copied to secondary storage, wherein the one or more first stub files and the one or more second stub files reside on the destination storage device;

receiving a plurality of log entries indicative of data operations generated by a computer application for execution on a source storage device;

traversing the plurality of log entries and for copying the log entries to execute the data operations on said replication data; and restoring copied data from a secondary storage device to said destination storage device based on the one or more first stub files, identifying the one or more first stub files at least in part based on the one or more first stub files comprising the predetermined tag value; and replacing the one or more first stub files with the copied data from the secondary storage device prior to executing the data operations on the replication data.

19. The destination system of claim 18, wherein each of the one or more second stub files comprises a tag value different than the at least one predetermined tag value.

20. The destination system of claim 18, further comprising instructions for capturing a snapshot of the replication data in a known good state.

* * * * *